US009817222B2

(12) United States Patent
Suzuki et al.

(10) Patent No.: US 9,817,222 B2
(45) Date of Patent: Nov. 14, 2017

(54) MICROSCOPE SYSTEM INCLUDING A LASER SOURCE, A PLURALITY OF LASER MICROSCOPES, AND AN OPTICAL PATH SWITCHING UNIT TO SWITCH A SUPPLY DESTINATION OF A LASER FROM THE LASER SOURCE

(71) Applicant: OLYMPUS CORPORATION, Shibuya-ku, Tokyo (JP)

(72) Inventors: Shingo Suzuki, Hachioji (JP); Takuma Kimura, Kiyose (JP); Makio Ueno, Nagano (JP)

(73) Assignee: OLYMPUS CORPORATION, Tokyo (JP)

( * ) Notice: Subject to any disclaimer, the term of this patent is extended or adjusted under 35 U.S.C. 154(b) by 139 days.

(21) Appl. No.: 14/874,009

(22) Filed: Oct. 2, 2015

(65) Prior Publication Data

US 2016/0103309 A1 Apr. 14, 2016

(30) Foreign Application Priority Data

Oct. 9, 2014 (JP) .................................. 2014-208065
Dec. 5, 2014 (JP) .................................. 2014-246950

(51) Int. Cl.
*G02B 21/06* (2006.01)
*G02B 21/24* (2006.01)
(Continued)

(52) U.S. Cl.
CPC ............. *G02B 21/06* (2013.01); *G02B 21/24* (2013.01); *G02B 27/145* (2013.01); *G02B 26/0816* (2013.01); *G02B 27/144* (2013.01)

(58) Field of Classification Search
CPC .. G02B 21/00; G02B 21/0004; G02B 21/002; G02B 21/0024; G02B 21/0028;
(Continued)

(56) References Cited

U.S. PATENT DOCUMENTS 5,948,291 A 9/1999 Neylan et al.
2002/0181096 A1 12/2002 Sasaki
(Continued)

FOREIGN PATENT DOCUMENTS

| JP | 10325924 A | 12/1998 |
|----|-----------|---------|
| JP | 2003322799 A | 11/2003 |
| JP | 2008203416 A | 9/2008 |

OTHER PUBLICATIONS

Extended European Search Report dated Mar. 14, 2016, issued in counterpart European Application No. 15188294.1.

*Primary Examiner* — Arnel C Lavarias
(74) *Attorney, Agent, or Firm* — Holtz, Holtz & Voltek PC

(57) ABSTRACT

A microscope system includes a laser light source, a plurality of laser microscopes, and an optical path switching unit that is provided between the laser light source and the laser microscopes and switches a supply destination of a laser beam among the plurality of laser microscopes by changing a beam splitter to be arranged on an incident optical axis. Each of the laser microscopes includes an optical axis adjustment unit that adjusts an optical axis of the laser beam, and a control unit that controls the optical axis adjustment unit based on identification information about the beam splitter arranged on the incident optical axis.

13 Claims, 10 Drawing Sheets

(51) Int. Cl.
 *G02B 26/08* (2006.01)
 *G02B 27/14* (2006.01)
(58) Field of Classification Search
 CPC ............ G02B 21/0032; G02B 21/0036; G02B 21/0052; G02B 21/006; G02B 21/0064; G02B 21/0072; G02B 21/0076; G02B 21/06; G02B 21/18; G02B 21/36; G02B 21/361; G02B 21/362; G02B 21/364
 USPC .......... 359/362, 363, 368, 369, 372, 385, 38
 See application file for complete search history.

(56) References Cited

U.S. PATENT DOCUMENTS

| | | | |
|---|---|---|---|
| 2008/0278801 A1* | 11/2008 | Koike | G02B 21/16 359/385 |
| 2010/0165435 A1 | 7/2010 | Grapov et al. | |
| 2011/0216404 A1* | 9/2011 | Nezu | G02B 21/0044 359/385 |
| 2012/0243081 A1 | 9/2012 | Honda | |

* cited by examiner

FIG. 3

FIRST LASER MICROSCOPE

|  | 700 | 750 | 800 | 850 | 900 | 950 | 1000 |
|---|---|---|---|---|---|---|---|
| 100:0 | P1, θ1 | P2, θ2 | P3, θ3 | P4, θ4 | P5, θ5 | P6, θ6 | P7, θ7 |
| 50:50 | P8, θ8 | P9, θ9 | P10, θ10 | P11, θ11 | P12, θ12 | P13, θ13 | P14, θ14 |
| 0:100 | – | – | – | – | – | – | – |

SECOND LASER MICROSCOPE

|  | 700 | 750 | 800 | 850 | 900 | 950 | 1000 |
|---|---|---|---|---|---|---|---|
| 100:0 | – | – | – | – | – | – | – |
| 50:50 | P8, θ8 | P9, θ9 | P10, θ10 | P11, θ11 | P12, θ12 | P13, θ13 | P14, θ14 |
| 0:100 | P15, θ15 | P16, θ16 | P17, θ17 | P18, θ18 | P19, θ19 | P20, θ20 | P21, θ21 |

FIG. 6

FIRST LASER MICROSCOPE

| 50:50 | 700 | 750 | 800 | 850 | 900 | 950 | 1000 |
|---|---|---|---|---|---|---|---|
| | P8, θ8 | P9, θ9 | P10, θ10 | P11, θ11 | P12, θ12 | P13, θ13 | P14, θ14 |

| 100:0 | ΔPa, Δθa |
|---|---|
| 0:100 | — |

SECOND LASER MICROSCOPE

| 50:50 | 700 | 750 | 800 | 850 | 900 | 950 | 1000 |
|---|---|---|---|---|---|---|---|
| | P8, θ8 | P9, θ9 | P10, θ10 | P11, θ11 | P12, θ12 | P13, θ13 | P14, θ14 |

| 100:0 | — |
|---|---|
| 0:100 | ΔPc, Δθc |

MICROSCOPE SYSTEM INCLUDING A LASER SOURCE, A PLURALITY OF LASER MICROSCOPES, AND AN OPTICAL PATH SWITCHING UNIT TO SWITCH A SUPPLY DESTINATION OF A LASER FROM THE LASER SOURCE

This application is based on Japanese Patent Application No. 2014-208065 filed on Oct. 9, 2014 and Japanese Patent Application No. 2014-246950 filed on Dec. 5, 2014, the contents of which are incorporated herein by reference.

TECHNICAL FIELD

The present invention relates to a microscope system.

BACKGROUND ART

Conventionally, a microscope system including a laser light source capable of switching an output wavelength includes a microscope system having a function of automatically correcting a shift in an optical axis of a laser beam occurring with switching of the wavelength of the laser beam has been known (see, e.g., PTL 1). In PTL 1, a position sensor detects a position of the laser beam to be incident on a laser microscope via a mirror from a laser light source, and the mirror is translated and rotated so that the position of the laser beam detected by the position sensor becomes a predetermined position, to correct the optical axis of the laser beam.

On the other hand, a microscope system that shares an expensive laser light source among a plurality of laser microscopes has been known (see, e.g., PTL 2). In PTL 2, an optical fiber connects the plurality of laser microscopes in parallel with one another to the single laser light source, to enable a laser beam to be output from the laser light source to be simultaneously supplied to the plurality of laser microscopes.

In the microscope system described in PTL 2, all the laser microscopes always remain optically connected to the laser light source. Therefore, an amount of the laser beam to be supplied to each of the laser microscopes is equally divided. A supply destination of the laser beam can be preferably changed depending on statuses of use of the plurality of laser microscopes.

Therefore, an optical member for controlling an optical path of the laser beam, for example, a beam splitter can be replaceably provided on an output optical axis of the laser light source. The laser beam can be selectively supplied to the desired laser microscope by selecting an optical member having an appropriate reflection/transmission characteristic to arrange the selected optical member on the output optical axis of the laser light source. Such switching of the optical path of the laser beam by replacement of the optical member is accompanied by a shift in the optical axis of the laser beam.

Furthermore, in the microscope system described in PTL 2, when the optical member such as the beam splitter is switched, the amount of the laser beam to be incident on a position sensor greatly changes depending on the reflection/transmission characteristic of the optical member. The position sensor can accurately detect the position of the laser beam when the signal level of the laser beam incident on the position sensor falls within the appropriate range.

CITATION LIST

Patent Literature

{PTL 1} Japanese Unexamined Patent Application, Publication No. 2003-322799
{PTL 2} Japanese Unexamined Patent Application, Publication No. Hei 10-325924

SUMMARY OF INVENTION

According to a first aspect of the present invention, a microscope system includes a laser light source that outputs a laser beam, a plurality of laser microscopes, and an optical path switching unit that is provided between the laser light source and the plurality of laser microscopes and switches an optical path of the laser beam output from the laser light source among a plurality of optical paths respectively directed toward the plurality of laser microscopes, in which the optical path switching unit includes a plurality of beam splitters that respectively distribute the incident laser beam among the plurality of optical paths in different distribution ratios, and can switch the laser microscope to which the laser beam is supplied by changing the beam splitter arranged on the incident optical axis of the laser beam from the laser light source, and each of the plurality of laser microscopes includes an optical axis adjustment unit that adjusts the optical axis of the laser beam supplied from the optical path switching unit, and a control unit that acquires identification information about the beam splitter to be arranged on the incident optical axis from the optical path switching unit and controls the optical axis adjustment unit based on the acquired identification information.

According to a second aspect of the present invention, a microscope system includes a laser light source that generates a laser beam, a plurality of laser microscopes, and an optical path switching unit that is provided between the plurality of laser microscopes and the laser light source and distributes the laser beam emitted from the laser light source among the laser microscopes, in which the optical path switching unit includes a plurality of beam splitters respectively having different distribution ratios for the laser beam, and can switch the laser microscope to which the laser beam is supplied by changing the beam splitter to be arranged on the optical path of the laser beam from the laser light source, and each of the plurality of laser microscopes includes an optical axis shift detection unit that detects an amount of shift in the optical axis of the laser beam supplied from the optical path switching unit from the optical axis of the laser microscope based on a position of incidence of the laser beam, a light adjustment unit that can adjust an amount of the laser beam to be incident on the optical axis shift detection unit, an optical axis adjustment unit that corrects a shift in the optical axis of the laser beam supplied from the optical path switching unit, and a control unit that controls the optical axis adjustment unit based on the amount of shift in the optical axis of the laser beam detected by the optical axis shift detection unit after the light adjustment unit restricts an amount of incidence of the laser beam within a predetermined range.

According to a third aspect of the present invention, a microscope system includes a laser light source that generates a laser beam, a plurality of laser microscopes, and an optical path switching unit that is provided between the plurality of laser microscopes and the laser light source and distributes the laser beam emitted from the laser light source among the laser microscopes, in which the optical path switching unit includes a plurality of beam splitters respectively having different distribution ratios for the laser beam, and can switch the laser microscope to which the laser beam is supplied by changing the beam splitter to be arranged on the optical path of the laser beam from the laser light source, and each of the plurality of laser microscopes includes an optical axis shift detection unit that detects an amount of shift in the optical axis of the laser beam supplied from the optical path switching unit from the optical axis of the laser microscope based on a position of incidence of the laser beam, an optical axis adjustment unit that can correct a shift in the optical axis of the laser beam supplied from the optical path switching unit, and a control unit that acquires the distribution ratio of the beam splitter arranged on an optical path of the laser beam and controls a sensitivity of the optical axis shift detection unit so that a signal level of the laser beam incident on the optical axis shift detection unit falls within a predetermined range based on the acquired distribution ratio while controlling the optical axis adjustment unit based on the amount of shift in the optical axis of the laser beam detected by the optical axis shift detection unit the sensitivity of which has been controlled.

BRIEF DESCRIPTION OF DRAWINGS

FIG. 3 illustrates an example of a preset table stored in a storage unit in the laser microscope illustrated in FIG. 2.

FIG. 6 illustrates an example of a preset table stored in a storage unit in a laser microscope in a microscope system according to a second embodiment of the present invention.

DESCRIPTION OF EMBODIMENTS

First Embodiment

A microscope system 100 according to a first embodiment of the present invention will be described below with reference to FIGS. 1 to 5.

Figure 1:
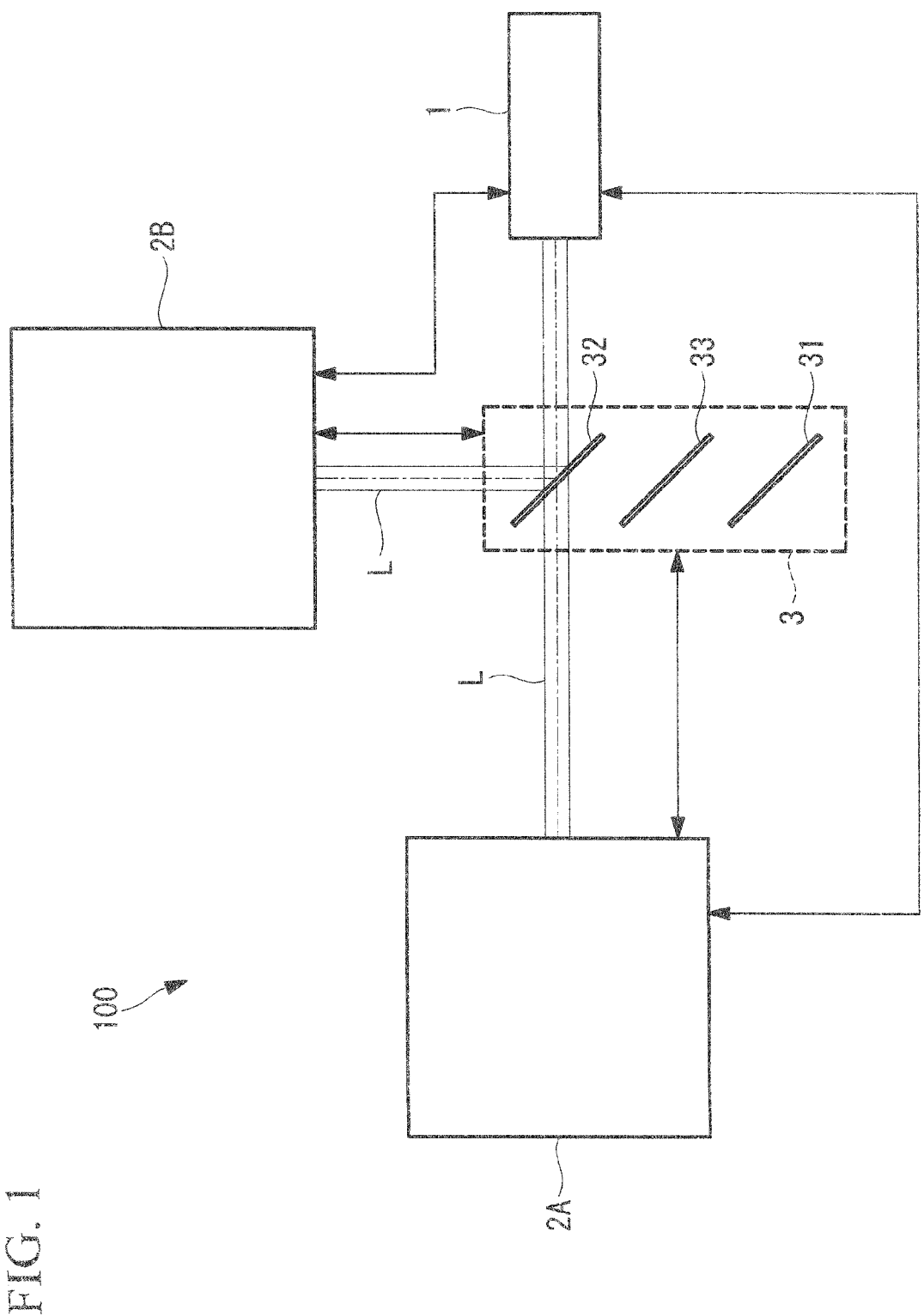
FIG. 1 is a block diagram illustrating an entire configuration of a microscope system according to a first embodiment of the present invention.

The microscope system 100 according to the present embodiment includes a single laser light source 1, a plurality of laser microscopes 2A and 2B, and an optical path switching unit 3 provided between the laser light source 1 and the plurality of laser microscopes 2A and 2B to switch the laser microscopes 2A and 2B to be supplied with a laser beam L output from the laser light source 1, as illustrated in FIG. 1.

While the microscope system 100 including the two laser microscopes 2A and 2B (hereinafter referred to as a first laser microscope 2A and a second laser microscope 2B) will be described as an example below, the number of laser microscopes may be three or more.

While the laser light source 1 is an ultrashort pulsed-laser light source that outputs an ultrashort pulsed-laser beam as the laser beam L, the wavelength of the laser beam L is alternatively selectable from among a plurality of wavelengths. In the present embodiment, the laser light source 1 capable of switching the wavelength of the laser beam L at 50 nm intervals in a range of 700 nm to 1000 nm is assumed.

The optical path switching unit 3 includes three beam splitters 31, 32, and 33, and the three beam splitters 31, 32, and 33 can be alternatively arranged on an incident optical axis of the laser beam L to be incident on the optical path switching unit 3 from the laser light source 1 by inserting and removing a cassette, for example. The two laser microscopes 2A and 2B are connected in parallel with each other to the laser light source 1 via the beam splitter arranged on the incident optical axis. The laser beam L, which has been transmitted by the beam splitter on the incident optical path, is guided to an optical path directed toward the first laser microscope 2A, and the laser beam L, which has been reflected by the beam splitter on the incident optical path, is guided to an optical path directed toward the second laser microscope 2B.

The three beam splitters 31, 32, and 33 respectively have different reflection/transmission characteristics (distribution ratios) for the laser beam L. More specifically, when the reflection/transmission characteristic is represented by an "amount of transmitted light:amount of reflected light", the reflection/transmission characteristic of the first beam splitter 31, the reflection/transmission characteristic of the second beam splitter 32, and the reflection/transmission characteristic of the third beam splitter 33 are respectively "100:0", "50:50", and "0:100".

Therefore, the optical path switching unit 3 can switch a supply destination of the laser beam L into one or both of the two laser microscopes 2A and 2B depending on the beam splitter to be arranged on the incident optical axis of the laser beam L. More specifically, the laser beam L is supplied to only the first laser microscope 2A if the first beam splitter 31 is arranged on the incident optical axis, the laser beam L is supplied to both the first laser microscopes 2A and 2B if the second beam splitter 32 is arranged on the incident optical axis, and the laser beam L is supplied to only the second laser microscope 2B if the third beam splitter 33 is arranged on the incident optical axis.

The laser microscopes 2A and 2B have the same configuration. Constitutional elements in each of the laser microscopes 2A and 2B are assigned the same reference numerals, and hence overlapped description is not repeated.

Figure 2:
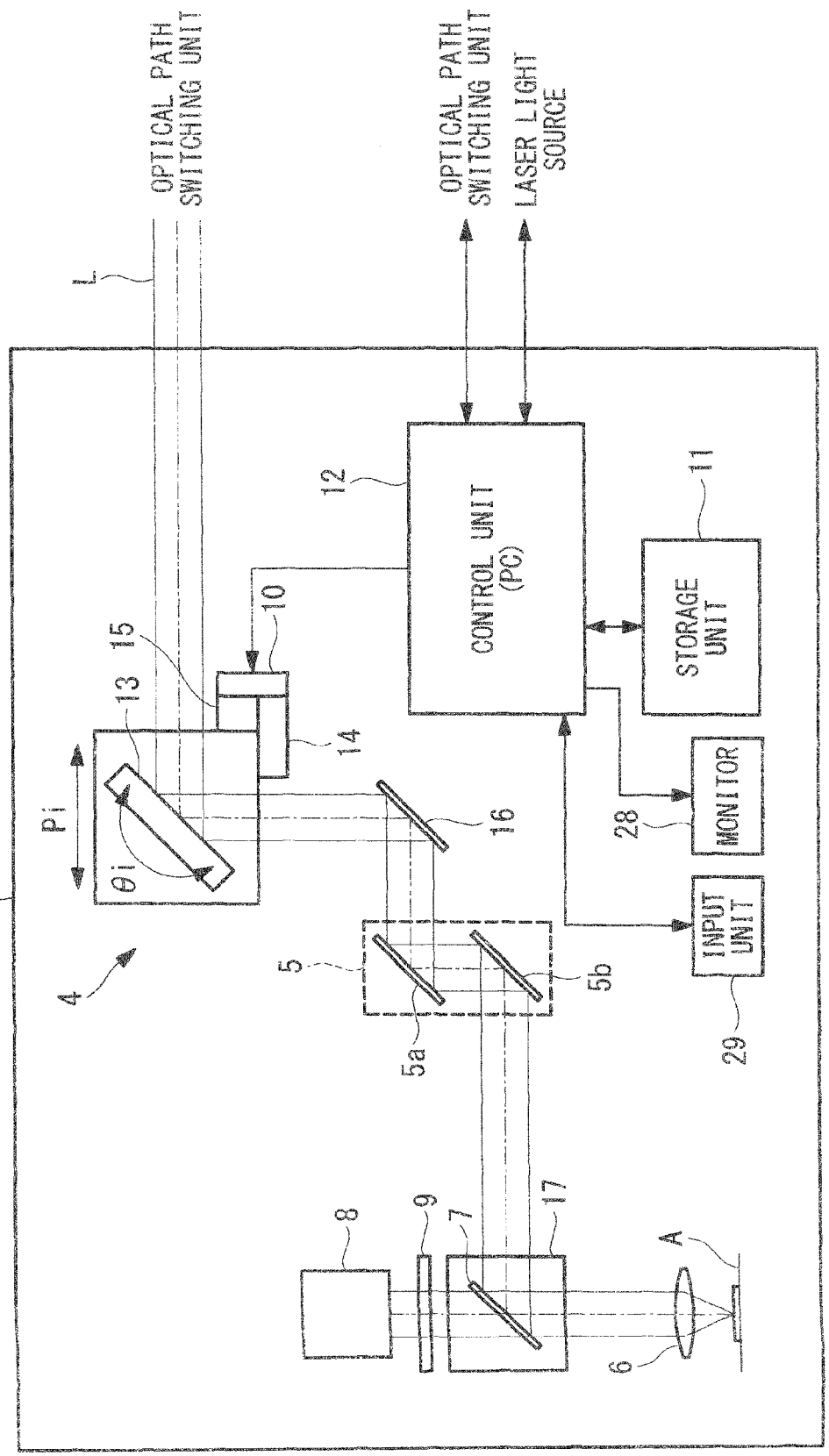
FIG. 2 is a block diagram illustrating an entire configuration of a laser microscope in the microscope system illustrated in FIG. 1.

Each of the laser microscopes 2A and 2B includes an auto-alignment device 4 that automatically corrects the optical axis of the laser beam L incident via the optical path switching unit 3 from the laser light source 1, a control unit 12 that controls the laser light source 1, the optical path switching unit 3, and the auto-alignment device 4 while generating an image, a monitor 28 that displays the image generated by the control unit 12, and an input unit 29 such as a mouse or a keyboard connected to the control unit 12, as illustrated in FIG. 2.

Furthermore, each of the laser microscopes 2A and 2B includes a scanner 5 that scans the laser beam L emitted from the auto-alignment device 4 in a two-dimensional manner, an objective lens 6 that collects the laser beam L scanned by the scanner 5 and irradiates a sample A with the collected laser beam L while collecting a fluorescence generated in the sample A, a dichroic mirror 7 that branches the fluorescence collected by the objective lens 6 from the laser beam L, a light detector 8 that detects the fluorescence branched by the dichroic mirror 7, and a barrier filter 9 that is disposed between the dichroic mirror 7 and the light detector 8 and passes the fluorescence and blocks the laser beam L.

The auto-alignment device 4 includes an optical axis adjustment unit 10 that adjusts the optical axis of the laser beam L incident from the optical path switching unit 3 according to the control by the control unit 12, and a storage unit 11 that stores correction values used to adjust the optical axis of the laser beam L by the optical axis adjustment unit 10.

The optical axis adjustment unit 10 is arranged on an ideal incident optical axis of the laser beam L to be incident on the laser microscopes 2A and 2B from the optical path switching unit 3. The optical axis adjustment unit 10 includes a mirror 13 arranged to be inclined with respect to the ideal incident optical axis, a position adjustment unit 14 that translates the mirror 13 in a direction along the ideal incident optical axis, and an inclination adjustment unit 15 that changes an angle of inclination of the mirror 13. A fixed mirror 16 deflects the laser beam L, which has been reflected by the mirror 13, toward a galvanometer mirror 5a (described below) in the scanner 5.

The position adjustment unit 14 can move the optical axis of the laser beam L reflected by the mirror 13 and emitted therefrom in a direction perpendicular to the optical axis by translating the mirror 13.

The inclination adjustment unit 15 can change an inclination of the optical axis of the laser beam L reflected by the mirror 13 and emitted therefrom by changing the angle of inclination of the mirror 13.

The storage unit 11 stores a preset table in a matrix shape using information about the wavelengths of the laser light source 1 (values of the wavelengths in FIG. 3) and identification information about the beam splitters 31, 32, and 33 (reflection/transmission characteristics thereof in FIG. 3), respectively, as a vertical axis and a horizontal axis. In the preset table, a target position Pi (i=1, 2, . . . , 21) and a target angle of inclination θi (i=1, 2, . . . , 21) of the mirror 13, which are individually set for each of combinations of the information about the wavelengths of the laser beam L and the identification information about the beam splitters 31, 32, and 33, are registered as correction values.

The optical axis of the laser beam L to be output from the laser light source 1 varies with the switching of the wavelength. The optical axis of the laser beam L to be incident on the mirror 13 in each of the laser microscopes 2A and 2B from the optical path switching unit 3 varies with the switching of the beam splitters 31, 32, and 33. Therefore, the incident optical axis of the laser beam L to be incident on the mirror 13 in each of the laser microscopes 2A and 2B from the optical path switching unit 3 does not necessarily match the ideal incident optical axis, and differs for each of the combinations of the wavelengths of the laser beam L and the beam splitters 31, 32, and 33 in use. The target position Pi and the target angle of inclination θi of the mirror 13, which are registered in the preset table, are respectively set to a position and angle at which the optical axis of the laser beam L reflected by the mirror 13 and emitted therefrom matches the original optical axis of each of the laser microscopes 2A and 2B.

The control unit 12 is a computer (hereinafter referred to as a PC 12) connected to be communicable with the laser light source 1 and the optical path switching unit 3.

The PC 12 is configured to enable the user to designate the wavelength of the laser beam L and the beam splitter to be used by the use of the input unit 29, for example. When the wavelength of the laser beam L and the beam splitter are designated, the PC 12, controls the laser light source 1 to switch the wavelength of the laser beam L into the designated wavelength, and controls the optical path switching unit 3 to arrange the designated beam splitter on the incident optical axis of the laser beam L.

The PC 12 in each of the laser microscopes 2A and 2B detects, when the wavelength of the laser beam L is switched in the laser light source 1, the switching of the wavelength, and performs an operation for automatically correcting the optical axis by controlling the optical axis adjustment unit 10 based on the correction values stored in the storage unit 11. Similarly, the PC 12 in each of the laser microscopes 2A and 2B detects, when the beam splitter to be arranged on the incident optical axis of the laser beam L is switched in the optical path switching unit 3, the switching of the beam splitter, and performs an operation for automatically correcting the optical axis by controlling the optical axis adjustment unit 10 based on the correction values stored in the storage unit 11. The operation for correcting the optical axis will be described below.

The scanner 5 includes two galvanometer mirrors 5a and 5b supported to be swingable around their axes perpendicular to each other, arranged to oppose each other, for example. The scanner 5 can two-dimensionally scan the laser beam L, for example, in a raster scan manner, by synchronously swinging the two galvanometer mirrors 5a and 5b.

A plurality of types of dichroic mirrors 7 are provided to be switchable by a switching mechanism 17 depending on a wavelength band of the laser beam L to be used.

The switching mechanism 17 can alternatively arrange the dichroic mirror 7 on the optical path. The switching mechanism 17 may rotate by a turret to switch the dichroic mirror 7, or may insert/remove a cassette to switch the dichroic mirror 7.

The light detector 8 is a photomultiplier tube, for example, to output intensity information about the detected fluorescence.

Figure 4:
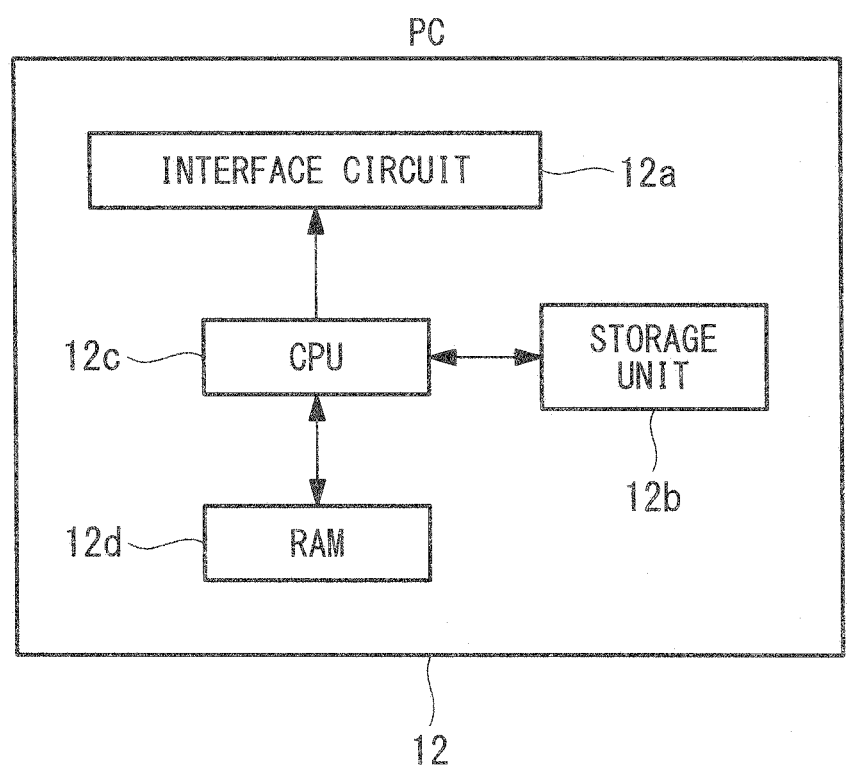
FIG. 4 is a block diagram illustrating a configuration of a control unit (personal computer (PC)) illustrated in FIG. 2.

The above described PC 12 includes an interface circuit 12a, a storage unit 12b such as a hard disk, a central processing unit (CPU) 12c, and a random access memory (RAM) 12d, as illustrated in FIG. 4. The monitor 28 and the input unit 29 are connected to the PC 12.

The interface circuit 12a inputs and outputs information to and from the laser light source 1, the optical path switching unit 3, and the optical axis adjustment unit 10.

Figure 5:
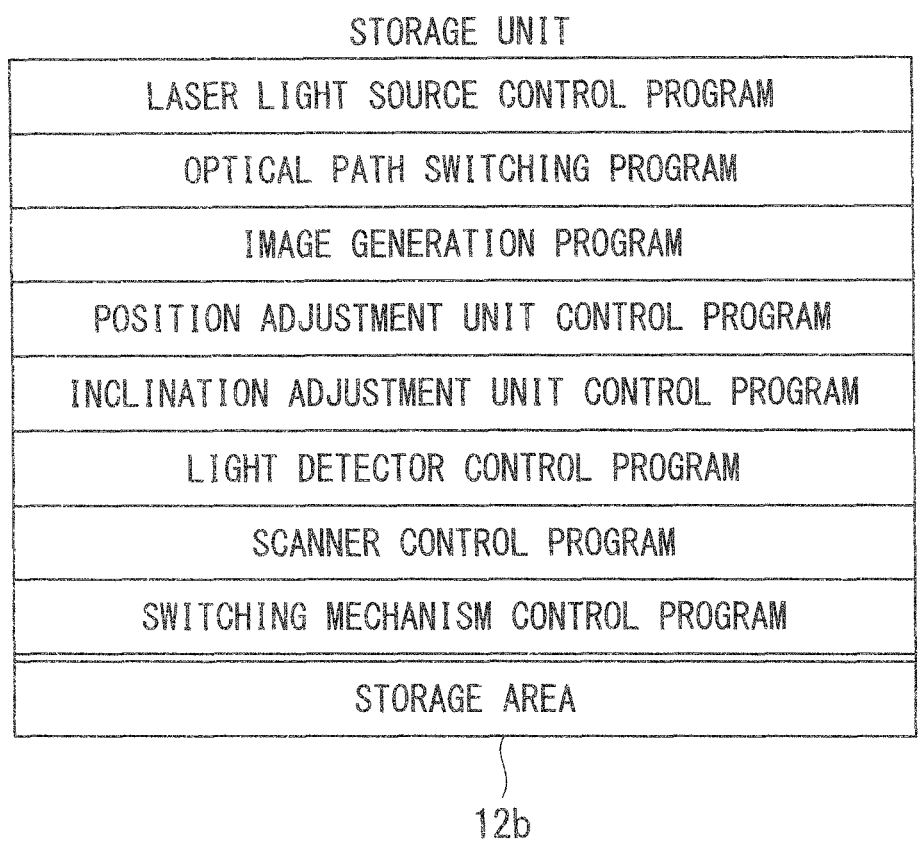
FIG. 5 illustrates a program of a central processing unit (CPU) stored in a storage unit in the PC illustrated in FIG. 4.

The storage unit 12b stores a program to be executed by the CPU 12c, as illustrated in FIG. 5. More specifically, the storage unit 12b stores a laser light source control program, an optical path switching unit control program, an image generation program, a position adjustment unit control program, an inclination adjustment unit control program, a light detector control program, a scanner control program, and a switching mechanism control program. The storage unit 12b has a storage area storing a two-dimensional image of the sample A generated by the image generation program.

The CPU 12c has a function of reading each of the above described programs stored in the storage unit 12b to execute the program. More specifically, the PC 12 executes the laser light source control program by the CPU 12c, to control the laser light source 1 so as to switch the wavelength of the laser beam L to the wavelength designated by the user with the input unit 29. The PC 12 executes the optical path switching control program by the CPU 12c, to control the optical path switching unit 3 so as to arrange any one of the beam splitters 31, 32, and 33 designated by the use with the input unit 29 on the optical path of the laser beam L.

The PC 12 executes the scanner control program by the CPU 12c, to control an operation for swinging the galvanometer mirrors 5a and 5b in the scanner 5. The PC 12 executes the light detector control program by the CPU 12c, to control the light detector 8. The PC 12 executes the image generation program by the CPU 12c, to generate a two-dimensional fluorescence image of the sample A based on intensity information about a fluorescence output from the light detector 8 and scanning position information about the laser beam L by the scanner 5 during detection of the florescence. The PC 12 executes the switching mechanism control program by the CPU 12c, to control the switching mechanism 17.

The PC 12 automatically corrects the optical axis of the laser beam L at predetermined timing. The predetermined timing is any one of the time when the PC 12 is started, the time when the PC 12 switches the beam splitter 31, 32, or 33 to be arranged on the optical path of the laser beam L in the optical path switching unit 3, and the time when the PC 12 switches the wavelength of the laser beam L from the laser light source 1.

In an operation for correcting the optical axis of the laser beam L, the PC 12 acquires the identification information about the beam splitter 31, 32, or 33 arranged on the optical path of the laser beam L from the optical path switching unit 5 and acquires the wavelength information about the laser beam L currently set from the laser light source 1. The PC 12 refers to the preset table stored in the storage unit 11, and reads out correction values Pi and θi corresponding to a combination of the acquired wavelength information about the laser beam L and the acquired identification information about any one of the beam splitters 31, 32, and 33. The PC 12 executes the position adjustment unit control program by the CPU 12c, to transmit an instruction signal for moving the mirror 13 to the target position Pi to the position adjustment unit 14 while executing the inclination adjustment unit control program by the CPU 12c, to transmit an instruction signal for inclining the mirror 13 at the target angle of inclination θi to the inclination adjustment unit 15, to respectively adjust the position and the angle of inclination of the mirror 13 by the position adjustment unit 14 and the inclination adjustment unit 15.

The function of the microscope system 100 according to the present embodiment thus configured will be described below while taking a case where the first laser microscope 2A is used as an example.

To perform fluorescent observation of the sample A using the microscope system 100 according to the present embodiment, the user first designates the wavelength of the laser beam L used for the fluorescent observation and the appropriate beam splitter 31 or 32 by the use of the input unit 29 for the PC 12 in the first laser microscope 2A used for the fluorescent observation. Thus, the wavelength of the laser beam L and the beam splitter are respectively switched by the laser light source 1 and the optical path switching unit 3, to supply the laser beam L having the desired wavelength to the first laser microscope 2A used by the user.

The laser beam L incident on the laser microscope 2A is guided to the scanner 5 via the mirrors 13 and 16, and is irradiated onto the sample A via the objective lens 6 while being scanned in a two-dimensional manner by the scanner 5. Thus, a multiphoton excitation phenomenon occurs on a focal plane of the objective lens 6, and a fluorescent material is excited to generate a fluorescence. The generated fluorescence is collected by the objective lens 6, is transmitted by the dichroic mirror 7, and is detected by the light detector 8 after the laser beam L is removed therefrom by the barrier filter 9. The PC 12 generates the two-dimensional fluorescence image of the sample A based on the intensity information about the fluorescence output from the light detector 8 and the scanning position information about the laser beam L by the scanner 5 during detection of the fluorescence. The generated fluorescence image is displayed on the monitor 28 so that the sample A can be observed on the fluorescence image.

In this case, when the wavelength of the laser beam L and the beam splitter 31, 32, or 33 are respectively switched by the laser light source 1 and the optical path switching unit 3, the PCs 12 in both the laser microscopes 2A and 2B detect operations for the switching so that the optical axis is automatically corrected in each of the laser microscopes 2A and 2B. More specifically, each of the PCs 12 respectively acquires the information about the wavelength of the laser beam L and the identification information about the beam splitter 31 or 32 from the laser light source 1 and the optical path switching unit 3, acquires correction values corresponding to a combination of the acquired information about the wavelength of the laser beam L and the acquired identification information about the beam splitter 31 or 32 from the storage unit 11, and respectively adjusts the position and the angle of inclination of the mirror 13 by the position adjustment unit 14 and the inclination adjustment unit 15 according to the acquired correction values. Thus, the optical axis of the laser beam L, which has been shifted from an ideal optical axis when the laser beam L is incident on the mirror 13, is corrected to match the original optical axis of each of the laser microscopes 2A and 2B in the succeeding stage of the mirror 13.

When the user designates the first beam splitter 31, the laser beam L is not supplied to the second laser microscope 2B. In the second laser microscope 2B to which the laser beam L is not supplied, the optical axis need not be corrected. Thus, the above described operation for automatically correcting the optical axis may not be performed.

Thus, according to the present embodiment, the target position Pi and the target angle of inclination θi of the mirror 13, which are optimized so that the optical axis of the laser beam L incident on each of the laser microscopes 2A and 2B matches the original optical axis of the laser microscope, are previously registered in the storage unit 11 for all combinations of the wavelengths of the laser beam L and the beam splitters 31, 32, and 33. When at least one of the wavelength of laser beam L and the beam splitter 31, 32, or 33 to be used is changed, the mirror 13 is automatically adjusted to the target position Pi and the target angle of inclination θi optimized for the combination of the wavelengths of the laser beam L and the beam splitter 31, 32, or 33 after the change.

Even if the wavelength of the laser beam L and the beam splitter 31, 32, or 33 to be used are changed, therefore, the optical axis of the laser beam L to be incident on the sample A is not shifted so that the fluorescence image in the same region of the sample A can be always acquired. In addition, the optical axis of the laser beam L can be accurately corrected by a simple and quick operation of the mirror 13 for only adjusting the position and the angle of the mirror 13 to the target position Pi and the target angle of inclination θi previously registered.

Second Embodiment

A microscope system according to a second embodiment of the present invention will be described below with reference to FIG. 6.

In the description of the microscope system according to the present embodiment, portions common in configuration to those in the above described microscope system 100 according to the first embodiment are assigned the same reference numerals, and hence description thereof is not repeated.

The microscope system according to the present embodiment differs from that in the first embodiment in a preset table stored in a storage unit 11 in an auto-alignment device 4, as illustrated in FIG. 6.

In the present embodiment, two types of preset tables are respectively stored in the storage units 11 in each of laser microscopes 2A and 2B, as illustrated in FIG. 6.

In the first preset table, information about the wavelength of a laser beam L is made to correspond to a target position (a first correction value) Pi (i=8, 9, . . . , 14) and a target angle of inclination θi (a first correction value) (i=8, 9, . . . , 14) of a mirror 13. The target position Pi and the target angle of inclination θi are a position and an angle of inclination that are optimized for each of the wavelengths of the laser beam L when one, set as a reference, of three beam splitters 31, 32, and 33 (e.g., the beam splitter 32) is arranged on an incident optical axis of the laser beam L.

In the second preset table, each of the two beam splitters other than the reference beam splitter (e.g., the beam splitters 31 and 33) is made to correspond to amounts of offset (second correction values) ΔPj and Δθj (j=a, c) of a position and an angle of inclination of the mirror 13. The amounts of offset ΔPj and Δθj are respectively change amounts of the position and the angle of inclination of the mirror 13, which are required to cancel a shift in the optical axis of the laser beam L occurring with switching from the reference beam splitter 32 to the other beam splitter 31 or 33 under use of the laser beam L having the same wavelength. When the reference beam splitter 32 is used, the amounts of offset are handled as zero.

In the present embodiment, the PC 12 first refers to the first preset table stored in the storage unit 11, and acquires the correction values Pi and θi corresponding to information about the wavelength of the laser beam L acquired from the laser light source 1 from the first preset table.

The PC 12 then controls a position adjustment unit 14 and an inclination adjustment unit 15 so that the mirror 13 is adjusted to the target position Pi and the target angle of inclination θi when identification information about the beam splitter acquired from the optical path switching unit 3 is about the reference beam splitter 32.

On the other hand, when the identification information about the beam splitter acquired from the optical path switching unit 3 is about the beam splitter 31 or 33 other than the reference beam splitter 32, the PC 12 further refers to the second preset table stored in the storage unit 11, and acquires the amounts of offset ΔPj or Δθj corresponding to the beam splitter 31 or 33 from the second preset table. The PC 12 controls the position adjustment unit 14 to translate the mirror 13 to a position obtained by adding the amount of offset ΔPj to the target position Pi. The PC 12 controls the inclination adjustment unit 15 to incline the mirror 13 at an angle obtained by adding the amount of offset Δθj to the target angle of inclination θi.

A shift in the optical axis of the laser beam L to be incident on the laser microscopes 2A and 2B from an ideal optical axis becomes the sum of a shift caused by switching of the wavelength of the laser beam L and a shift caused by switching the beam splitter 31, 32, or 33. Therefore, optimum correction values of the mirror 13 can be obtained even by using the correction values Pi and θi set for each of the wavelengths of the laser beam L and the correction values ΔPj and Δθj set for each of the beam splitters 31, 32, and 33 in combination. The number of correction values to be previously registered in the preset table may be small by using such two types of preset tables so that the preset tables can be easily created.

The other effects of the present embodiment are similar to those in the first embodiment, and hence description thereof is not repeated.

Third Embodiment

Figure 7:
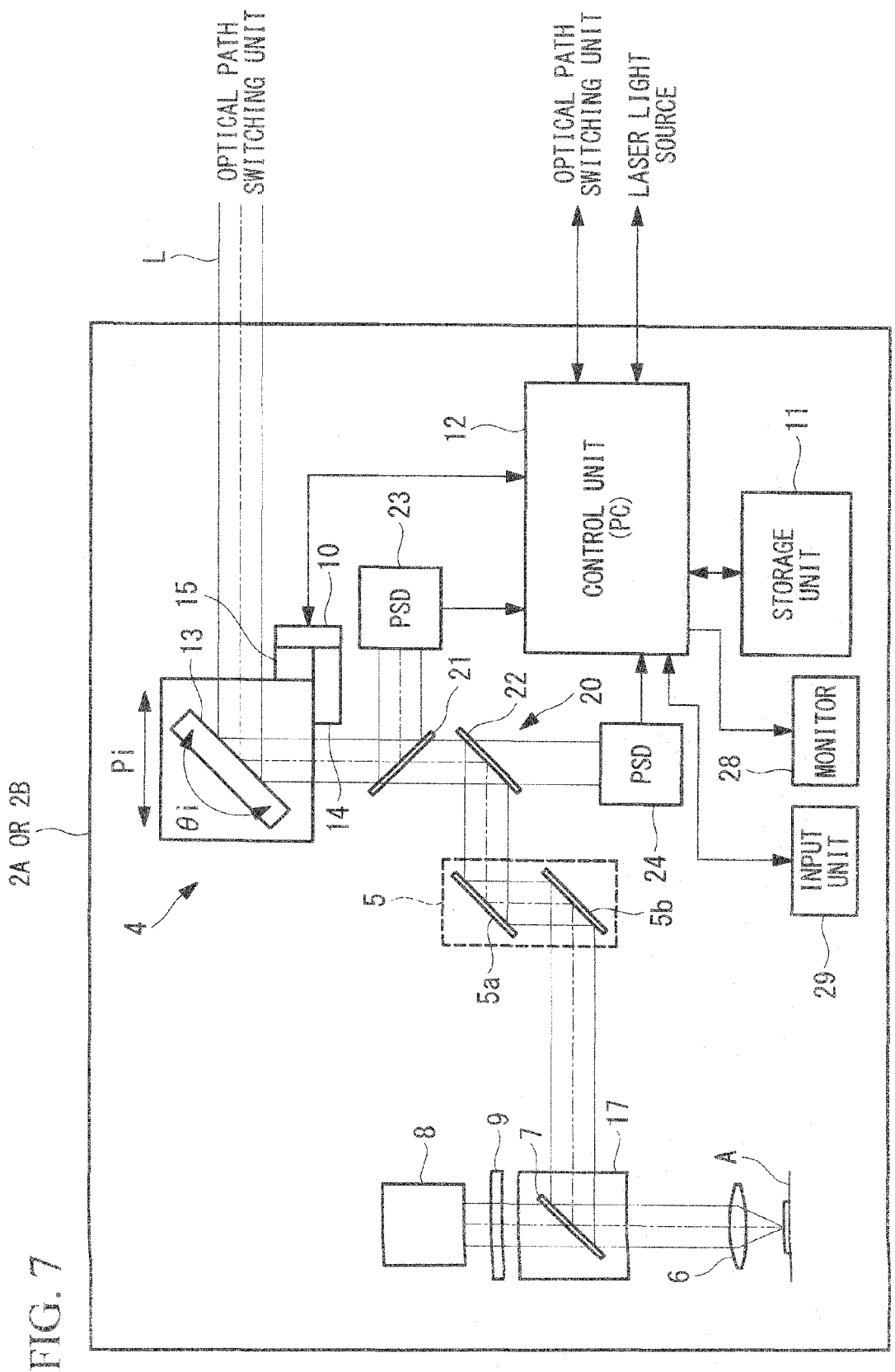
FIG. 7 is a block diagram illustrating an entire configuration of a laser microscope in a microscope system according to a third embodiment of the present invention.

A microscope system according to a third embodiment of the present invention will be described below with reference to FIG. 7.

In the description of the microscope system according to the present embodiment, portions common in configuration to those in the above described microscope system 100 according to the first embodiment are assigned the same reference numerals, and hence description thereof is not repeated.

The microscope system according to the present embodiment differs from that in the first embodiment in that an auto-alignment device 4 further includes an optical axis shift detection unit 20 that detects an amount of shift in an optical axis of a laser beam L from an original optical axis of each of laser microscopes 2A and 2B, and an optical axis adjustment unit 10 corrects the shift in the optical axis of the laser beam L depending on a detection result by the optical axis shift detection unit 20.

The optical axis shift detection unit 20 includes beam splitters 21 and 22 that branch a part of the laser beam L from an optical path in the succeeding stage of the optical axis adjustment unit 10 and two sensors 23 and 24 that respectively detect the laser beam L branched from the optical path by the beam splitters 21 and 22 via different optical path lengths.

The beam splitter 21 reflects a part of the laser beam L toward the sensor 23, and transmits the remaining laser beam L toward the beam splitter 22. The beam splitter 22 transmits a part of the laser beam L, which has been transmitted by the beam splitter 21, toward the sensor 24 while reflecting the remaining laser beam L toward a scanner 5.

The sensors 23 and 24 are respectively position sensitive detectors (PSDs) (hereinafter referred to as PSDs 23 and 24) each using a four-split photodiode, for example. Each of the PSDs 23 and 24 can detect an amount of offset, along a direction perpendicular to the original optical axis of each of the laser microscopes 2A and 2B, of the laser beam L from the original optical axis based on balance among outputs of four sensor portions (not illustrated) corresponding to a light amount and a spot position (position of incidence) of the received laser beam L. Each of the PSDs 23 and 24 can detect an amount of inclination of the laser beam L from the original optical axis of each of the laser microscopes 2A and 2B depending on a difference between respective amounts of offset in the two PSDs 23 and 24 via different optical path lengths. Each of the PSDs 23 and 24 transmits the detected amount of offset or angle of inclination to the PC 12.

In the present embodiment, a storage unit 12b further stores an optical axis adjustment unit control program (not illustrated) for respectively calculating instruction signals to a position adjustment unit 14 and an inclination adjustment unit 15 from the amounts of offset and the amounts of inclination received from the PSDs 23 and 24.

The PC 12 reads out corresponding correction values from a preset table in the storage unit 11 based on information about the wavelength of the laser beam L and identification information about a beam splitter 31, 32, or 33, and executes a position adjustment unit control program and an inclination adjustment unit control program by the CPU 12c, to cause the position adjustment unit 14 and the inclination adjustment unit 15 to adjust a position and an angle of inclination of a mirror 13 according to the read correction values.

Then, the PC 12 executes an optical axis adjustment unit control program by the CPU 12c, to calculate the instruction signals to the position adjustment unit 14 and the inclination adjustment unit 15 for eliminating an offset and an inclination of the optical axis of the laser beam L at positions of the two PSDs 23 and 24, respectively, upon receipt of outputs from the PSDs 23 and 24. The PC 12 respectively transmits the calculated instruction signals to the position adjustment unit 14 and the inclination adjustment unit 15. Thus, the position adjustment unit 14 and the inclination adjustment unit 15 finely adjust the mirror 13 so that the shift in the optical axis of the laser beam L is eliminated at the positions of the PSDs 23 and 24.

According to the microscope system according to the present embodiment thus configured, the PSDs 23 and 24 detect an actual position and angle of the optical axis of the laser beam L after the optical axis adjustment unit 10 corrects the optical axis of the laser beam L based on the preset table. If the optical axis of the laser beam L does not accurately match the original optical axis of each of the laser microscopes 2A and 2B, the optical axis adjustment unit 10 further corrects the optical axis of the laser beam L to accurately match the original optical axis of the laser microscope 2A and 2B. Thus, the optical axis of the laser beam L can be further accurately corrected. The other effect of the present embodiment is similar to that in the first embodiment, and hence description thereof is not repeated.

In the present embodiment, the PSDs 23 and 24 are irradiated with the laser beam L required for fluorescent observation. Therefore, the PSDs 23 and 24 may be protected by turning off driving power sources of the PSDs 23 and 24 or closing shutters (not illustrated) arranged ahead of the PSDs 23 and 24.

Fourth Embodiment

Figure 8:
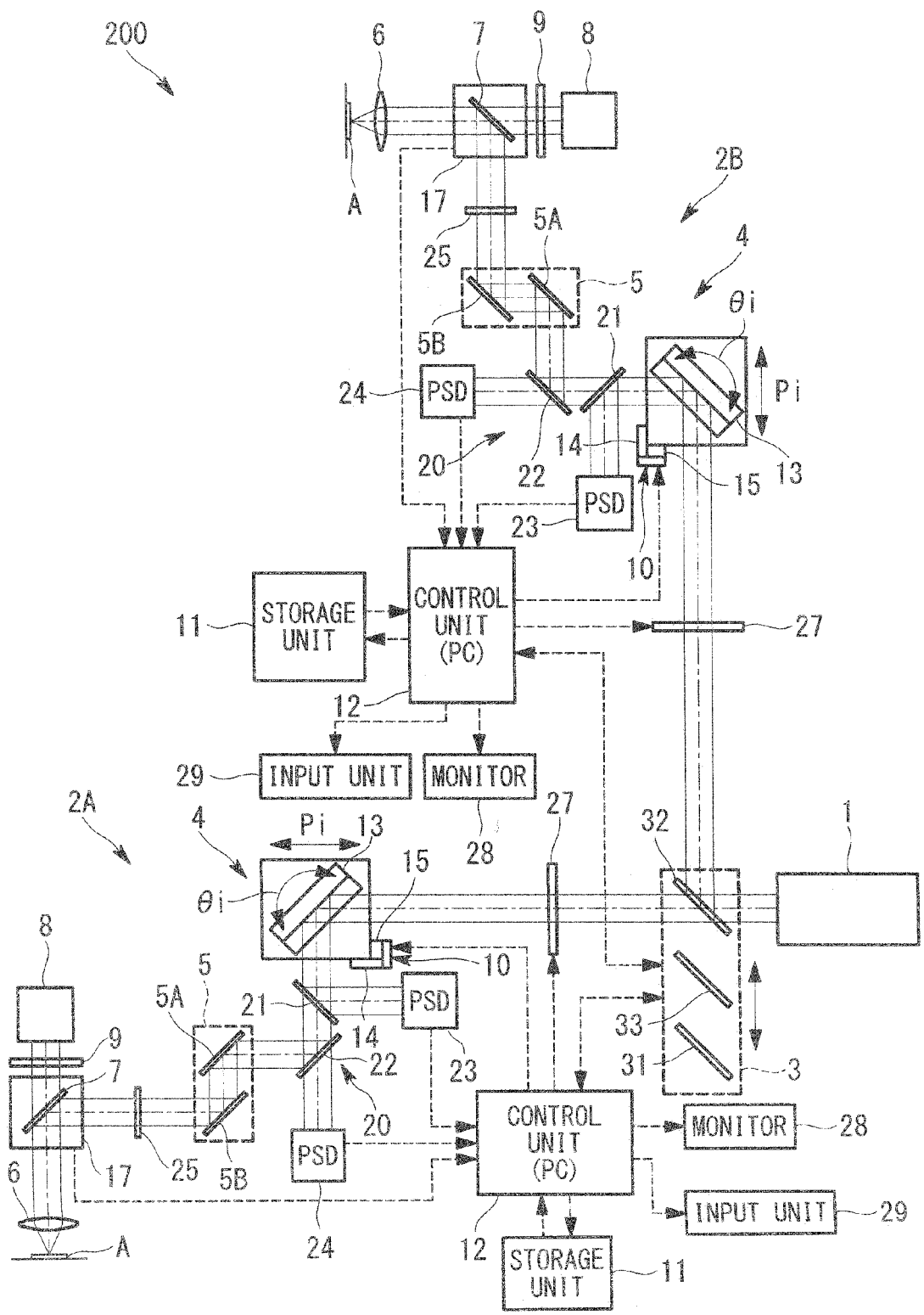
FIG. 8 is a schematic configuration diagram illustrating a microscope system according to a fourth embodiment of the present invention.

A microscope system according to a fourth embodiment of the present invention will be described below with reference to FIG. 8.

In the description of the microscope system according to the present embodiment, portions common in configuration to those in the above described microscope system 100 according to the first embodiment are assigned the same reference numerals, and hence description thereof is not repeated.

In the present embodiment, each of laser microscopes 2A and 2B further includes a shutter 25 arranged between a scanner 5 and a dichroic mirror 7.

Furthermore, each of the laser microscopes 2A and 2B includes an acousto-optic modulator (AOM) 27 capable of adjusting an amount of a laser beam L supplied from an optical path switching unit 3 as a light adjustment unit. An auto-alignment device 4 automatically adjusts an optical axis of the laser beam L that has been transmitted by the AOM 27.

The AOM 27 is arranged on an optical path between the optical path switching unit 3 and the auto-alignment device 4. The AOM 27 can adjust the amount of the laser beam L to be incident on the auto-alignment device 4 by changing transmissivity of the laser beam L to restrict the transmission of the laser beam L supplied from the optical path switching unit 3.

In the present embodiment, the auto-alignment device 4 includes an optical axis shift detection unit 20 described in the third embodiment.

PSDs 23 and 24 can correctly recognize a spot position of the laser beam L when an amount of the incident laser beam L is within a predetermined range. If the amount of the incident laser beam L is too smaller or too larger than a predetermined range, for example, the spot position of the laser beam L cannot be correctly recognized.

A storage unit 11 further stores respective reflection/transmission characteristics of three beam splitters 31, 32, and 33 in the optical path switching unit 3 and transmissivity of the AOM 27 adjusted so that respective amounts of the laser beam L to be incident on the PSDs 23 and 24 are within the predetermined range when the reference beam splitter (the beam splitter 32 in this example) is arranged on an optical path of the laser beam L (hereinafter referred to as reference transmissivity of the AOM 27) as preset data.

An interface circuit 12a also inputs and outputs information to and from the AOM 27.

Figure 9:
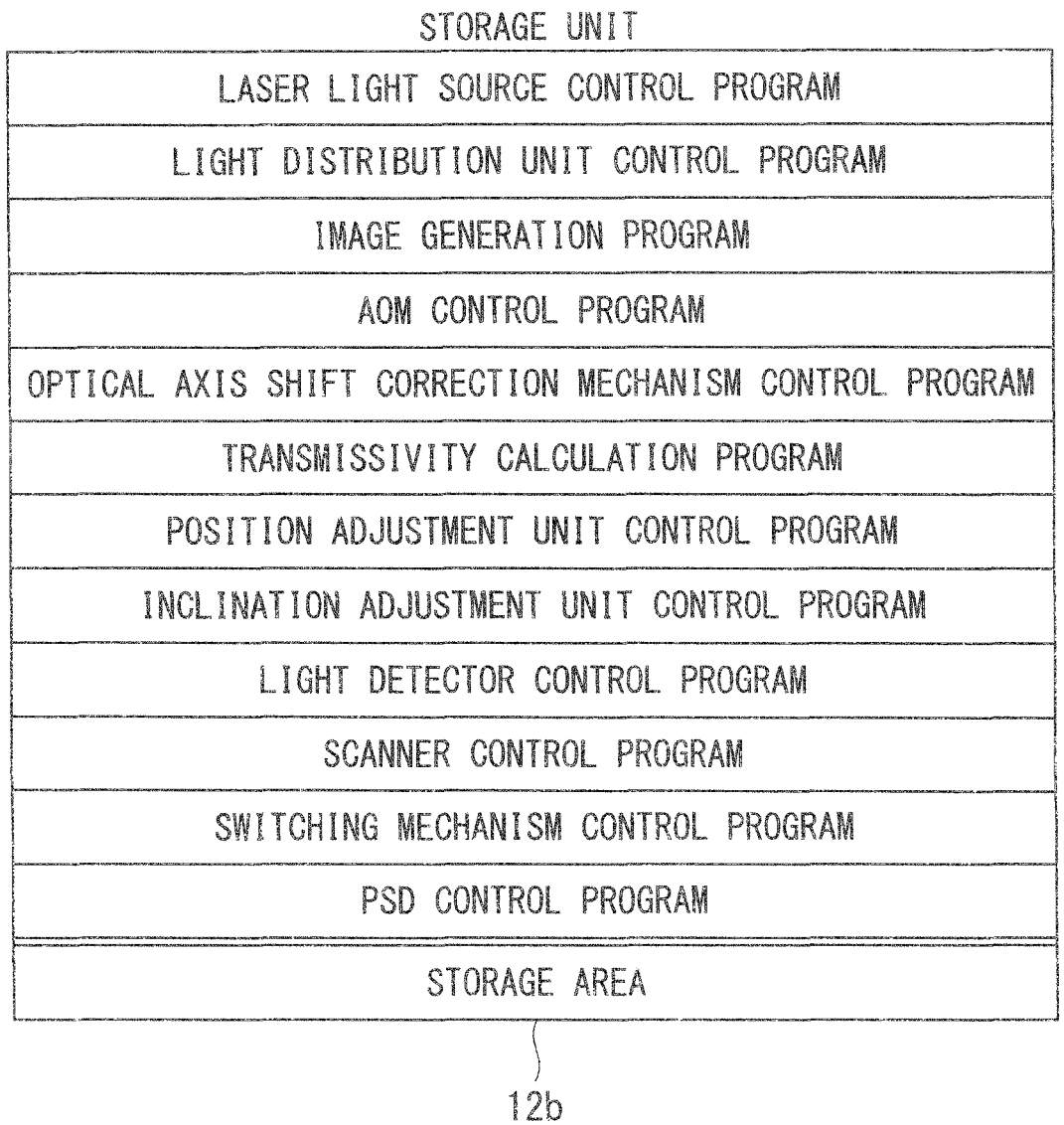
FIG. 9 illustrates a program of a CPU stored in a storage unit in a PC in the microscope system illustrated in FIG. 8.

A storage unit 12b further stores an AOM control program, a transmissivity calculation program, and a PSD control program, as illustrated in FIG. 9.

A PC 12 executes the PSD control program by a CPU 12c, to control respective sensitivity gains of the PSDs 23 and 24.

The PC 12 adjusts an amount of the laser beam L to be incident on the optical axis shift detection unit 20 in addition to the above described automatic adjustment of the optical axis of the laser beam L at the above described predetermined timing.

More specifically, when the amount of the laser beam L is adjusted, the PC 12 acquires identification information about the beam splitter 31, 32, or 33 arranged on the optical path of the laser beam L from the optical path switching unit 3. The PC 12 reads out preset data corresponding to the acquired identification information from the storage unit 11. The PC 12 executes the transmissivity calculation program by the CPU 12c, to calculate transmissivity to be set in the AOM 27 according to the following equation (1), and then the PC 12 executes the AOM control program by the CPU 12c, to set the calculated transmissivity in the AOM 27.

Transmissivity to be set in AOM 27=reference transmissivity of AOM 27×reflection/transmission characteristic of reference beam splitter 32÷reflection/transmission characteristic of any beam splitter 31, 32, 33 arranged on optical path of laser beam L  (1)

The function of the microscope system 200 thus configured will be described while taking a case where the second laser microscope 2B is used as an example.

In the microscope system 200 according to the present embodiment, for the second laser microscope 2B to perform fluorescent observation of a sample A, for example, the user designates the wavelength of the laser beam L used for the fluorescence observation and one of the beam splitters 32 and 33 by the use of the input unit 29.

For example, the user is assumed to designate the beam splitter 32. The beam splitter 32 distributes the laser beam L between both the laser microscopes 2A and 2B. In this case, in both the laser microscopes 2A and 2B, the designated wavelength is set in the laser light source 1 while the shutter 25 is closed, and the beam splitter 32 is arranged on the optical path of the laser beam L under the control by the PC 12. When the shutter 25 is closed, the sample A can be prevented from being photobleached by being illuminated with extra light while the optical axis of the laser beam L is automatically corrected.

In each of the laser microscopes 2A and 2B, the amount of the laser beam L is then adjusted. First, the PC 12 acquires the identification information about the beam splitter 32 arranged on the optical path of the laser beam L from the optical path switching unit 3 so that corresponding preset data, i.e., the reference transmissivity of the AOM 27, the reflection/transmission characteristic of the reference beam splitter 32, and the reflection/transmission characteristic of the beam splitter 32 corresponding to the acquired identification information are read out of the storage unit 11.

Then, the PC 12 calculates the transmissivity to be set in the AOM 27 according to the foregoing equation (1). For example, if the reference transmissivity of the AOM 27 is 10%, 10% is calculated as the transmissivity to be set in the AOM 27, since the reflectivity of the reference beam splitter 32 is 50% and the reflectivity of the beam splitter 32 arranged on the optical path of the laser beam L is 50%.

Then, the PC 12 sets the calculated transmissivity in the AOM 27, and the AOM 27 restricts the transmission of the laser beam L. Thus, respective amounts of the laser beam L to be incident on the two PSDs 23 and 24 in the optical axis shift detection unit 20 are restricted in a predetermined range regardless of the reflection/transmission characteristic of the beam splitter 32.

Then, in each of the laser microscopes 2A and 2B, the optical axis of the laser beam L is corrected. First, the PC 12 acquires set wavelength information about the laser beam L from the laser light source 1, refers to a preset table stored in the storage unit 11, and reads out correction values Pi and θi corresponding to a combination of the acquired wavelength information about the laser beam L and the identification information about the beam splitter 32. The PC 12 controls the position adjustment unit 14 and the inclination adjustment unit 15 based on the read correction values, to adjust a position and an angle of inclination of a mirror 13. Thus, the optical axis of the laser beam L is corrected to match the beam splitter 32 and the wavelength of the laser beam L.

When the laser beam L is then generated from the laser light source 1, the laser beam L is supplied to the second laser microscope 2B after half of the laser beam L is reflected by the beam splitter 32 in the optical path switching unit 3. The laser beam L supplied to the second laser microscope 2B is reflected by the mirror 13 in an optical axis adjustment unit 10 after being transmitted by the AOM 27. The laser beam L is branched by beam splitters 21 and 22 in the optical axis shift detection unit 20 so that its part is detected by the PSDs 23 and 24.

In each of the PSDs 23 and 24, the laser beam L in the light amount restricted in a predetermined range is received, and an amount of offset and an amount of inclination of the optical axis of the laser beam L are detected and sent to the PC 12. Thus, in each of the laser microscopes 2A and 2B, the optical axis of the laser beam L is corrected again.

The PC 12 first calculates respective instruction signals for eliminating an offset and an inclination of the optical axis of the laser beam L at a position of each of the PSDs 23 and 24 based on the amount of offset and the amount of inclination sent from the PSD. The PC 12 controls the position adjustment unit 14 and the inclination adjustment unit 15 based on the calculated instruction signals, to further adjust a position and an angle of inclination of the mirror 13. Thus, the optical axis of the laser beam L to be irradiated onto the sample A can be further accurately corrected.

When the automatic correction of the optical axis ends by the above described operation, fluorescent observation of the sample A is performed. More specifically, the PC 12 controls the AOM 27 to have an intensity of the laser beam L required for the fluorescence observation previously set and the shutter 25 is opened. Thus, the laser beam L can be irradiated onto the sample A from the scanner 5.

In this case, the laser beam L required for the fluorescent observation is also irradiated onto the PSDs 23 and 24. Therefore, the PSDs 23 and 24 may be protected by respectively turning off driving power sources of the PSDs 23 and 24 or closing shutters (not illustrated) arranged ahead of the PSDs 23 and 24.

Then, the PC 12 switches the beam splitter 32 to the beam splitter 33 in the optical path switching unit 3 according to an instruction from the user. The beam splitter 33 distributes the laser beam L to only the laser microscope 2B. In this case, in the laser microscope 2B, adjustment of the amount of the laser beam L and automatic correction of the optical axis of the laser beam L are performed.

First, the PC 12 closes the shutter 25, the identification information about the beam splitter 33 arranged on the optical path of the laser beam L is acquired from the optical path switching unit 3, and corresponding preset data is read out of the storage unit 11. The PC 12 calculates the transmissivity to be set in the AOM 27 according to the above described equation (1). In this case, the reference transmissivity of the AOM 27 is 10%, the reflectivity of the reference beam splitter 32 is 50%, and the reflectivity of the beam splitter 33 after the switching is 100%. Therefore, 5% is calculated as the transmissivity to be set in the AOM 27.

Then, the PC 12 sets the calculated transmissivity in the AOM 27, and the AOM 27 restricts the transmission of the laser beam L. Thus, respective amounts of the laser beam L to be incident on the two PSDs 23 and 24 in the optical axis shift detection unit 20 are restricted in a predetermined range regardless of the reflection/transmission characteristic of the beam splitter 33.

Then, the PC 12 reads out the correction values Pi and θi corresponding to a combination of the current wavelength information about laser beam L and the identification information about the beam splitter 33 from the storage unit 11 based on the wavelength information about the laser beam L and the identification information about the beam splitter 33. The PC 12 controls the position adjustment unit 14 and the inclination adjustment unit 15 to adjust the position and the angle of inclination of the mirror 13 based on the read correction values. Thus, the optical axis of the laser beam L is corrected to match the beam splitter 33.

Furthermore, in the PSDs 23 and 24, the laser beam L in the light amount restricted within the predetermined range with the switching to the beam splitter 33 is received, and an amount of offset and an amount of inclination of the optical axis of the detected laser beam L are sent to the PC 12. The PC 12 calculates the instruction signals to the optical axis adjustment unit 10 for eliminating the offset and the inclination of the optical axis of the laser beam L at positions of the PSDs 23 and 24 based on the amount of offset and the amount of inclination. The PC 12 controls the position adjustment unit 14 and the inclination adjustment unit 15 based on the calculated instruction signals, to adjust the position and the angle of inclination of a mirror 13. Thus, the optical axis of the laser beam L can be more accurately corrected and irradiated onto the sample A even after the switching to the beam splitter 33.

If the first laser microscope 2A performs fluorescent observation of a sample A instead of the second laser microscope 2B, the user designates one of the beam splitters 31 and 32 by the use of the input unit 29. In the case, in the laser microscope 2A, the PC 12 controls an AOM 27 and an optical axis adjustment unit 10 based on the identification information about the beam splitters 31 and 32, to adjust the amount of the laser beam L and correct the optical axis of the laser beam L, as described above. In this case, similar processing may be performed using transmissivity as the wavelength transmission characteristics of the beam splitters 31 and 32. The transmissivity may be calculated from data representing reflectivity.

As described above, the amount of the laser beam L to be supplied to each of the laser microscopes 2A and 2B from the optical path switching unit 3 may greatly change while the optical axis is shifted as the beam splitter 31, 32, or 33 to be arranged on the optical path changes. The microscope system 300 according to the present embodiment can detect amounts of shift in the optical axis of the laser beam L by the PSDs 23 and 24 with high accuracy regardless of the reflection/transmission characteristic of the beam splitter 31, 32, or 33 to be arranged on the optical path by restricting the amount of the laser beam L to be incident on the PSDs 23 and 24 from the optical path switching unit 3 in the predetermined range by the AOM 27 in each of the laser microscopes 2A and 2B.

Therefore, the optical axis adjustment unit 10 can correct the shift in the optical axis of the laser beam L supplied from the optical path switching unit 3 to match the original optical axis with high accuracy based on the amount of shift in the optical axis of the laser beam L detected with high accuracy by the PSDs 23 and 24. Accordingly, when a supply destination of the laser beam L emitted from the laser light source 1 is switched between the laser microscopes 2A and 2B, the optical axis of the laser beam L is corrected with high accuracy not to be shifted in each of the laser microscopes 2A and 2B so that a high-accuracy fluorescence image in the same region of the sample A can be always acquired.

While the AOM 27 has been illustrated as an example of the light adjustment unit in the present embodiment, a neutral density (ND) filter, an acousto-optic turnable filter (AOTF), or an optical attenuator may be used if the respective amounts of the laser beam L to be incident on the PSDs 23 and 24 can be adjusted.

Fifth Embodiment

A microscope system according to a fifth embodiment of the present invention will be described below with reference to FIG. 8.

A microscope system 200 according to the present embodiment differs from that in the fourth embodiment in terms of controlling an AOM 27 also in consideration of wavelength information about a laser beam L to be generated from a laser light source 1 in addition to reflection/transmission characteristics of beam splitters 31, 32, and 33.

Portions common in configuration to those in the microscope system 200 according to the fourth embodiment are assigned the same reference numerals, and hence description thereof is not repeated.

A storage unit 11 stores, in addition to the reflection/transmission characteristics of the three beam splitters 31, 32, and 33 in an optical path switching unit 3, transmissivity of the AOM 27 adjusted so that respective amounts of the laser beam L to be incident on PSDs 23 and 24 are within a predetermined range when the reference beam splitter 32 is arranged on an optical path and when the laser beam L is emitted with reference power (hereinafter referred to as reference transmissivity of the AOM 27), a preset table in which the wavelength of the laser beam L and the reflection/transmission characteristics of the beam splitters 31, 32, and 33 are made to correspond to each other, and a preset table in which the wavelength of the laser beam L and emission power of laser beam L are made to correspond to each other as preset data.

When an amount of the laser beam L is adjusted, the PC 12 acquires wavelength information about the laser beam L set in the laser light source 1 in addition to identification information about the beam splitters 31, 32, and 33, and reads out the corresponding preset data from the storage unit 11. The PC 12 calculates transmissivity to be set in the AOM 27 according to the following equation (2), and sets the calculated transmissivity in the AOM 27.

Transmissivity to be set in AOM 27=reference transmissivity of AOM 27×(reflection/transmission characteristic of reference beam splitter 32×emission power of reference laser beam L)÷(reflection/transmission characteristic of any beam splitter 31, 32, 33 arranged on optical path of laser beam L×emission power of laser beam L after change)  (2)

The function of the microscope system 200 thus configured will be described.

In the microscope system 200 according to the present embodiment, when the wavelength of the laser beam L to be generated from the laser light source 1 or the beam splitter 31 or 32 to be arranged on the optical path of the laser beam L is switched, adjustment of a light amount by the AOM 27 and automatic correction of an optical axis of the laser beam L are performed in each of the laser microscopes 2A and 2B.

For example, if the second laser microscope 2B performs fluorescent observation of a sample A, i.e., if the beam splitter 32 or 33 is arranged on the optical path of the laser beam L, the PC 12 first closes a shutter 25, acquires the wavelength information about the laser beam L set in the laser light source 1 and the identification information about the beam splitter 32 or 33 arranged on the optical path of the laser beam L, and reads out the corresponding preset data from the storage unit 11. The PC 12 calculates the transmissivity to be set in the AOM 27 according to the foregoing equation (2), and sets the calculated transmissivity in the AOM 27. Thus, the AOM 27 restricts transmission of the laser beam L.

On the other hand, if the first laser microscope 2A performs fluorescent observation of a sample A, i.e., if the beam splitter 31 or 32 is arranged on the optical path of the laser beam L, the PC 12 acquires the wavelength information about the laser beam L set in the laser light source 1 and the identification information about the beam splitter 31 or 32 arranged on the optical path of the laser beam L, and reads out the corresponding preset data from the storage unit 11. The PC 12 calculates the transmissivity to be set in the AOM 27 according to the foregoing equation (2), and sets the calculated transmissivity in the AOM 27, and the AOM 27 restricts transmission of the laser beam L.

The emission power from the laser light source 1 may change depending on the wavelength of the generated laser beam L. The reflection/transmission characteristics of the beam splitters 31, 32, and 33 may change depending on the wavelength. In the microscope system 100 according to the present embodiment, the PC 12 controls the AOM 27 based on the wavelength information about the laser beam L set in the laser light source 1 and the identification information about the beam splitters 31, 32, and 33. By doing so, it is possible to restrict respective amounts of the laser beam L to be incident on the two PSDs 23 and 24 in the optical axis shift detection unit 20 in a predetermined range and detect an amount of shift in the optical axis of the laser beam L with high accuracy, regardless of the wavelength of the laser beam L to be generated from the laser light source 1 and the reflection/transmission characteristics of the beam splitter 31, 32, or 33 to be arranged on the optical path of the laser beam L.

Therefore, the optical axis adjustment unit 10 can correct the shift in the optical axis of the laser beam L supplied from the optical path switching unit 3 to match the original optical axis with high accuracy based on detection results of the PSDs 23 and 24 that the amount of shift in the optical axis has been detected with high accuracy in each of the laser microscopes 2A and 2B. The automatic correction of the optical axis of the laser beam L is similar to those in the third and fourth embodiments, and hence description thereof is not repeated.

Sixth Embodiment

A microscope system according to a sixth embodiment of the present invention will be described below.

Figure 10:
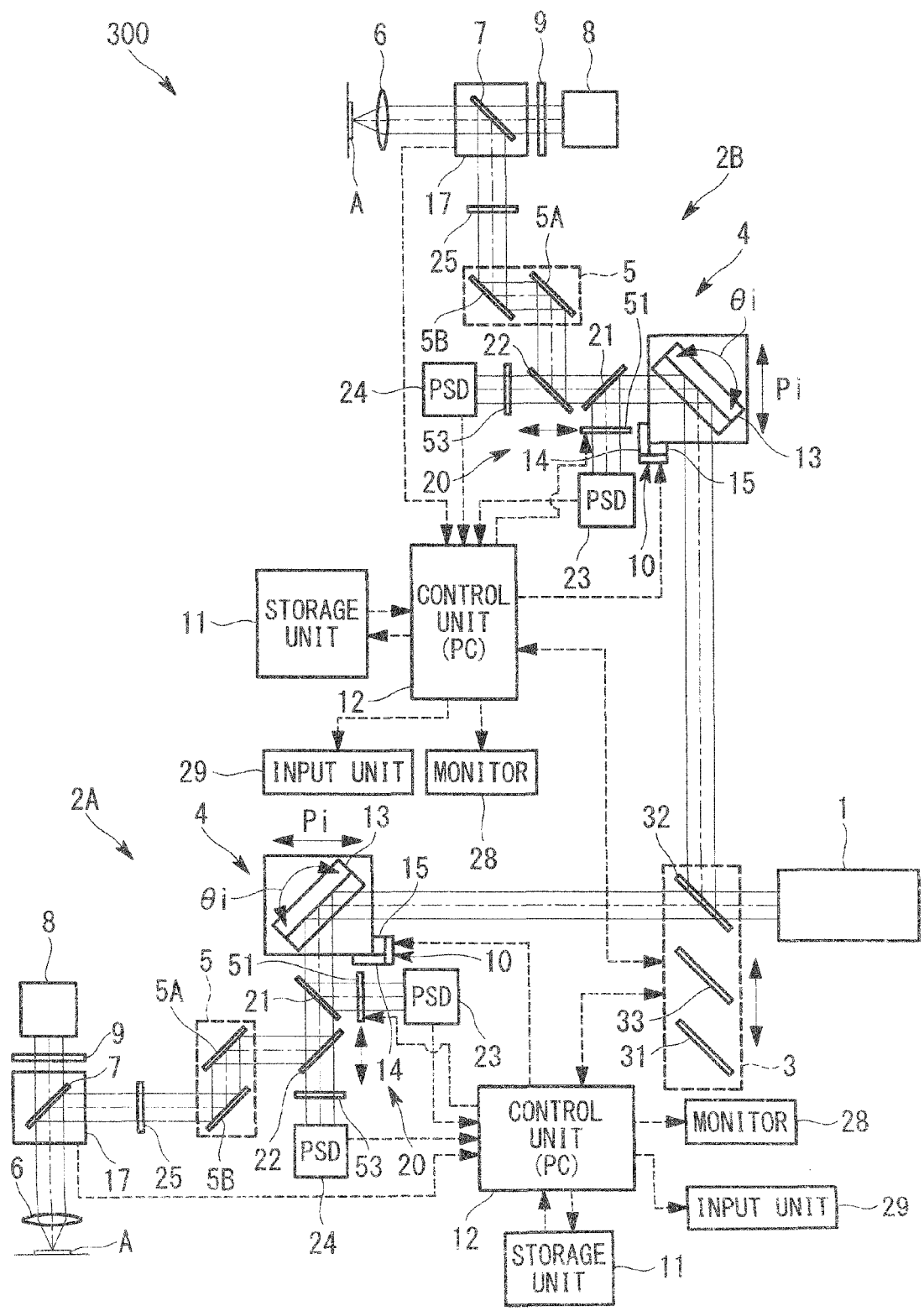
FIG. 10 is a schematic configuration diagram illustrating a microscope system according to a sixth embodiment of the present invention.

A microscope system 300 according to the present embodiment differs from that in the fourth embodiment in terms of using ND filters (filter members) 51 and 53 for restricting an amount of passage of a laser beam L by a predetermined amount corresponding to a reflection/transmission characteristic of the beam splitter 31, 32, or 33 instead of an AOM 27, as illustrated in FIG. 10.

Portions common in configuration to those in the microscope system 200 according to the fourth embodiment are assigned the same reference numerals, and hence description thereof is not repeated.

The ND filter 51 is arranged to be manually insertable/removable on an optical path of the laser beam L between the beam splitter 21 and the PSD 23, and the ND filter 53 is arranged to be manually insertable/removable on the optical path between the beam splitter 22 and the PSD 24. A percentage of passage of the laser beam L in each of the ND filters 51 and 53 is 50%. The ND filters 51 and 53 are arranged on the optical path of a laser beam L to respectively restrict amounts of the laser beam L to be passed so that respective amounts of the laser beam L to be incident on the PSD 23 and 24 can be reduced to half.

The function of the microscope system 300 thus configured will be described.

In the microscope system 300 according to the present embodiment, when the beam splitter 31, 32, or 33 to be arranged on the optical path of the laser beam L is switched, a shutter 25 is first closed. In each of laser microscopes 2A and 2B, a user manually inserts and removes the ND filters 51 and 53 depending on reflection/transmission characteristic of the beam splitter 31, 32, or 33 arranged on the optical path.

For example, if the beam splitter 31 is arranged on the optical path of the laser beam L, 100% of the laser beam L emitted from a laser light source 1 is distributed to the first laser microscope 2A by the beam splitter 31. Thus, the user inserts the ND filters 51 and 53 into the optical path of the laser beam L in the first laser microscope 2A.

On the other hand, if the beam splitter 32 is arranged on the optical path of the laser beam L, 50% of the laser beam L emitted from the laser light source 1 is distributed to each of the laser microscopes 2A and 2B by the beam splitter 32. Thus, the user removes the ND filters 51 and 53 from the optical path of the laser beam L in each of the laser microscopes 2A and 2B.

If the beam splitter 33 is arranged on the optical path of the laser beam L, 100% of the laser beam L emitted from the laser light source 1 is distributed to the second laser microscope 2B by the beam splitter 33. Thus, the user inserts the ND filters 51 and 53 into the optical path of the laser beam L in the second laser microscope 2B.

Then, the laser beam L is generated from the laser light source 1. The laser beam L emitted from the laser light source 1 and supplied to each of the laser microscopes 2A and 2B by the beam splitter 31, 32, or 33 is reflected by a mirror 13 in an optical axis adjustment unit 10 in its unchanged light amount, and is branched by the beam splitter 21 in an optical axis shift detection unit 20. If the ND filters 51 and 53 are arranged on the optical path, laser beam parts obtained by branching the laser beam L are respectively detected by the PSDs 23 and 24 by passing through the ND filters 51 and 53 so that their light amounts are reduced by half. On the other hand, if the ND filters 51 and 53 are not arranged on the optical path, laser beam parts obtained by branching the laser beam L are respectively detected in their unchanged light amounts by the PSD 23 and the 24.

Therefore, in the microscope system 200 according to the present embodiment, even if the amount of the laser beam L to be incident on the laser microscope 2B greatly changes by switching the beam splitter 31, 32, or 33, the laser beam L to be incident on the PSD 23 and the PSD 24 is restricted in a predetermined range by inserting/removing the ND filters 51 and 53 so that an amount of shift in the optical axis of the laser beam L can be detected with high accuracy.

Thus, in each of the laser microscopes 2A and 2B, the optical axis adjustment unit 10 can correct the shift in the optical axis of the laser beam L supplied from the optical path switching unit 3 with high accuracy to match the original optical axis based on detection results of the PSDs 23 and 24 that the amount of shift in the optical axis has been detected with high accuracy. Automatic correction of the optical axis of the laser beam L is similar to those in the third and fourth embodiments, and hence description thereof is not repeated. Each of the ND filters 51 and 53 may include a plurality of ND filters.

While the user manually inserts and removes the ND filters 51 and 53 in the present embodiment, the present invention is not limited to this. The PC 12 may control the insertion/removal of the ND filters 51 and 53 depending on a wavelength characteristic of the beam splitter 31, 32, or 33 to be arranged on the optical path of the laser beam L. In this case, in the PC 12, an ND filter control program may be stored in a storage unit 12b instead of an AOM control program. The PC 12 may execute the ND filter control program by a CPU 12c, to control the insertion/removal of the ND filters 51 and 53.

Seventh Embodiment

A microscope system according to a seventh embodiment of the present invention will be described below with reference to FIG. 8.

A microscope system 200 according to the present embodiment differs from that in the fifth embodiment in that a PC 12 controls respective sensitivities (gains) of PSDs 23 and 24 so that a signal level of a laser beam L incident on the PSDs 23 and 24 falls within a predetermined range instead of controlling an AOM 27.

Portions common in configuration to those in the microscope system 200 according to the fifth embodiment are assigned the same reference numerals, and hence description thereof is not repeated.

A storage unit 11 stores, in addition to respective reflection/transmission characteristics of three beam splitters 31, 32, and 33 in an optical path switching unit 3, respective sensitivities of the PSDs 23 and 24 so that the signal levels of the laser beam L incident on the PSDs 23 and 24 are in the predetermined range when the reference beam splitter 32 is arranged on an optical path and when the laser beam L is emitted with reference power (hereinafter referred to as reference sensitivities of the PSDs 23 and 24), and a preset table in which the wavelength of the laser beam L and the reflection/transmission characteristics of each of the beam splitters 31, 32, and 33 are made to correspond to each other, and a preset table in which the wavelength of the laser beam L and emission power of the laser beam L are made to correspond to each other as preset data.

When the sensitivities of the PSDs 23 and 24 are adjusted, the PC 12 acquires wavelength information about the laser beam L set in a laser light source 1 in addition to identification information about the beam splitters 31, 32, and 33, and reads out the corresponding preset data from the storage unit 11. The PC 12 executes a PSD control program by a CPU 12c, to calculate sensitivities to be set in the PSDs 23 and 24 according to the following equation (3), and respectively set the calculated sensitivities in the PSDs 23 and 24.

Sensitivity to be set in the PSD 23, 24=reference sensitivity of PSD 23, 24×(reflection/transmission characteristic of reference beam splitter 32×emission power of reference laser beam L)÷(reflection/transmission characteristic of any beam splitter 31, 32, 33 arranged on optical path of laser beam L×emission power of laser beam L after change) (3)

The function of the microscope system 200 thus configured will be described.

In the microscope system 200 according to the present embodiment, when the wavelength of the laser beam L to be generated from the laser light source 1 or the beam splitter 31, 32, or 33 to be arranged on the optical path of the laser beam L is switched, adjustment of a light amount by the AOM 27 and automatic correction of an optical axis of the laser beam L are performed in each of laser microscopes 2A and 2B.

For example, if the second laser microscope 2B performs fluorescent observation of a sample A, i.e., if the beam splitter 32 or 33 is arranged on the optical path of the laser beam L, the PC 12 first closes a shutter 25, acquires the wavelength information about the laser beam L set in the laser light source 1 and the identification information about the beam splitter 32 or 33 arranged on the optical path of the laser beam L, and reads out the corresponding preset data from the storage unit 11. The PC 12 turns on the laser light source 1, calculates the respective sensitivities to be set in the PSDs 23 and 24 according to the foregoing equation (3), and sets the calculated sensitivities in the PSDs 23 and 24. Thus, the signal levels from the PSDs 23 and 24 are restricted in accordance with the sensitivities of the PSDs 23 and 24.

On the other hand, if the first laser microscope 2A performs fluorescent observation of a sample A, i.e., if the beam splitter 31 or 32 is arranged on the optical path of the laser beam L, the PC 12 acquires the wavelength information about the laser beam L set in the laser light source 1 and the identification information about the beam splitter 31 or 32 arranged on the optical path of the laser beam L, and reads out the corresponding preset data from the storage unit 11. The PC 12 calculates the sensitivities to be set in the PSDs 23 and 24 according to the foregoing equation (3), and sets the calculated sensitivities in the PSDs 23 and 24. Thus, the signal levels from the PSDs 23 and 24 are restricted in accordance with the sensitivities of the PSDs 23 and 24.

Therefore, the microscope system 100 according to the present embodiment can make the signal levels in the PSDs 23 and 24 constant regardless of the wavelength of the laser beam L generated from the laser light source L and the reflection/transmission characteristic of the beam splitter 31, 32, or 33 to be arranged on the optical path of the laser beam L. Therefore, an optical axis adjustment unit 10 can correct a shift in the optical axis of the laser beam L supplied from the optical path switching unit 3 to match the original optical axis with high accuracy based on respective detection results of the PSDs 23 and 24. The automatic correction of the optical axis of the laser beam L is similar to those in the third and fourth embodiments, and hence description thereof is not repeated.

While the embodiments of the present invention have been specifically described above with reference to the drawings, a specific configuration is not limited to those in the embodiments, and also includes design changes without departing from the scope of the present invention. For example, the present invention is not limited to the embodiments and modified examples, may be applied to appropriate combinations of the embodiments and the modified examples, and is not to be particularly limited. While the beam splitters 31, 32, and 33 have been described as an example in each of the above described embodiments, the number of beam splitters may be two or four or more if the plurality of beam splitters differ from one another in wavelength transmission characteristics.

While the adjustment of the amount of light of the laser beam L by the AOM 27 or the ND filters 51 and 53 and the adjustment of the signal level by the PSDs 23 and 24 are individually performed in the fourth to seventh embodiments, such means may be combined with each other. For example, a difference in emission power depending on the wavelength of the laser beam L is adjusted by the sensitivities of the PSDs 23 and 24, and a change in the amount of light depending on the beam splitter 31, 32, or 33 are adjusted by the AOM 27 or the ND filters 51 and 53.

In the third to seventh embodiments, when the optical axis of the laser beam L is corrected, the preset table stored in the storage unit 11 is referred to, and the correction values Pi and θi in the preset table are read out, to adjust the mirror 13 to the target position Pi and the target angle θi. Then, the instruction signals to the optical axis adjustment unit 10 for eliminating the offset and the inclination of the optical axis of the laser beam L are calculated at the positions of the PSDs 23 and 24 upon receipt of the outputs from the two PSDs 23 and 24 in the optical axis shift detection unit 20. The PC 12 transmits the calculated instruction signals to the position adjustment unit 14 and the inclination adjustment unit 15, and finely adjusts the mirror 13 so that the position adjustment unit 14 and the inclination adjustment unit 15 eliminate the shift in the optical axis of the laser beam L at the positions of the PSDs 23 and 24.

The operation for finely adjusting the mirror 13 so that the shift in the optical axis of the laser beam L is eliminated at the positions of the PSDs 23 and 24 among the series of operations may require a certain period of time. The user may perform the finely adjusting operation at any timing. Thus, if an image that is sufficiently sustainable for observation is obtained while the correction values Pi and θi in the preset table are read out to adjust the mirror 13 to the target position Pi and the target angle θi, the efficiency of the observation can be increased by decreasing the number of times of the finely adjusting operation.

While the configuration in which each of the laser microscopes 2A and 2B includes a single auto-alignment device 4 to correct the optical axis of the laser beam L in one direction has been described in the first to seventh embodiments, a plurality of auto-alignment devices 4 may be provided so that the optical axis can also be corrected in another direction perpendicular to the one direction.

While the configuration in which the PC 12 automatically acquires the identification information about the beam splitters 31, 32, and 33 arranged on the incident optical axis of the laser beam L has been described in the first to seventh embodiments, the present invention is not limited to this. The user may manually input current settings of the wavelength of the laser beam L and the beam splitter 31, 32, or 33 to the PC 12 via input means such as a keyboard or a mouse.

Thus, the present invention can cope with a case where the beam splitter 31, 32, or 33 is manually switched by the user in the optical path switching unit 3 or a case where the wavelength of the laser beam L is manually set from a controller for the laser light source 1.

While the PC 12 in each of the laser microscopes 2A and 2B detects, when the wavelength of the laser beam L and the beam splitter 31, 32, or 33 has been switched, the switching, and automatically corrects the optical axis of the laser beam L by the auto-alignment device 4 in the first to seventh embodiments, the user can correct the optical axis of the laser beam L at any timing by inputting an instruction to correct the optical axis to the PC 12, for example, instead of or in addition to this.

From the above-described first to seventh embodiments, the following inventions are derived.

According to a first aspect of the present invention, a microscope system includes a laser light source that outputs a laser beam, a plurality of laser microscopes, and an optical path switching unit that is provided between the laser light source and the plurality of laser microscopes and switches an optical path of the laser beam output from the laser light source among a plurality of optical paths respectively directed toward the plurality of laser microscopes, in which the optical path switching unit includes a plurality of beam splitters that respectively distribute the incident laser beam among the plurality of optical paths in different distribution ratios, and can switch the laser microscope to which the laser beam is supplied by changing the beam splitter arranged on the incident optical axis of the laser beam from the laser light source, and each of the plurality of laser microscopes includes an optical axis adjustment unit that adjusts the optical axis of the laser beam supplied from the optical path switching unit, and a control unit that acquires identification information about the beam splitter to be arranged on the incident optical axis from the optical path switching unit and controls the optical axis adjustment unit based on the acquired identification information.

According to the first aspect of the present invention, the laser beam output from the laser light source is supplied to the plurality of laser microscopes connected to the laser light source via the optical path switching unit. The amount of the laser beam to be supplied to each of the laser microscopes is determined depending on the distribution ratio of the beam splitter arranged on the incident optical axis in the optical path switching unit. Therefore, the laser beam in a desired light amount can be selectively supplied to the desired laser microscope by arranging the appropriate beam splitter on the incident optical axis.

In this case, the optical axis of the laser beam emitted to the optical path directed to each of the laser microscopes from the optical path switching unit changes as the beam splitter arranged on the incident optical axis changes. In each of the laser microscopes, the control unit acquires the identification information about the beam splitter from the optical path switching unit, to recognize the beam splitter in use currently arranged on the incident optical axis, and cause the optical axis adjustment unit to adjust the optical axis of the laser beam suitable for the beam splitter in use. When a supply destination of the laser beam output from the laser light source is switched among the plurality of laser light sources, therefore, the optical axis of the laser beam can be corrected so that the optical axis of the laser beam is not shifted within each of the laser microscopes.

In the above described first aspect, the laser light source can alternately select a wavelength of the laser beam to be output from among a plurality of wavelengths, and the control unit may acquire information about the selected wavelength of the laser beam from the laser light source, and control the optical axis adjustment unit further based on the acquired information about the wavelength of the laser beam.

Thus, the shift in the optical axis of the laser beam caused by switching of the wavelength of the laser beam can also be simultaneously corrected by the optical axis adjustment unit.

In the above described first aspect, each of the plurality of laser microscopes may include a storage unit that stores a preset table in which identification information about the plurality of beam splitters and correction values are made to correspond to each other, and the control unit may acquire the correction values, which are made to correspond to the identification information about the beam splitters acquired from the optical path switching unit, from the preset table, and control the optical axis adjustment unit based on the acquired correction values.

Thus, the control unit may operate the optical axis adjustment unit according to the correction values previously registered in the preset table. Therefore, the optical axis of the laser beam can be quickly corrected by simple control.

In the above described first aspect, each of the plurality of laser microscopes may include a storage unit that stores a preset table in which correction values are made to correspond to each of combinations of the identification information about the plurality of beam splitters and the information about the plurality of wavelengths of the laser beam, and the control unit may acquire the correction values, which is made to correspond to the combination of the identification information about the beam splitter and the information about the wavelength of the laser beam respectively acquired from the optical path switching unit and the laser light source, from the preset table, and control the optical axis adjustment unit based on the acquired correction values.

Thus, the control unit may operate the optical axis adjustment unit according to the correction values previously registered in the preset table. Therefore, the optical axis of the laser beam can be quickly corrected by simple control.

In the above described first aspect, each of the plurality of laser microscopes may include a storage unit that stores a first preset table in which the identification information about the plurality of beam splitters and first correction values are made to correspond to each other, and a second preset table in which the information about the plurality of wavelengths and second correction values are made to correspond to each other, and the control unit may acquire the first correction values, which are made to correspond to the identification information about the beam splitter acquired from the optical path switching unit, from the first preset table while acquiring the second correction values, which are made to correspond to the information about the wavelength of the laser beam acquired from the laser light source, from the second preset table, and control the optical axis adjustment unit based on the acquired first correction values and the acquired second correction values.

Thus, the number of correction values to be registered in the preset table may be smaller than when the correction values are set for each of the combinations of the identification information about the beam splitters and the information about the wavelengths of the laser beam. Therefore, the preset table can be easily generated.

In the above described first aspect, each of the laser microscopes may include an optical axis shift detection unit that detects an amount of shift in the optical axis of the laser beam to be supplied from the optical path switching unit from an optical axis of the laser microscope based on a position of incidence of the laser beam, and the control unit may control the optical axis adjustment unit further based on the amount of shift detected by the optical axis shift detection unit.

Thus, the optical axis of the laser beam can be further accurately corrected.

In the above described first aspect, the control unit may cause the optical axis adjustment unit to adjust the optical axis of the laser beam when the optical axis switching unit changes the beam splitter arranged on the incident optical axis.

Thus, the optical axis of the laser beam can be automatically corrected at timing of when the optical axis of the laser beam is shifted.

In the above described first aspect, the microscope system may include a light adjustment unit that can adjust an amount of the laser beam to be incident on the optical axis shift detection unit. The laser microscope is preferably configured so that the amount of the laser beam to be incident on the optical axis shift detection unit is restricted within a predetermined range by the optical axis shift detection unit.

Thus, in each of the laser microscopes, the optical axis shift detection unit, which has restricted an amount of the laser beam incident thereon from the optical path switching unit in the predetermined range by the light adjustment unit, can detect the amount of shift in the optical axis of the laser beam with higher accuracy regardless of the distribution ratio of the beam splitter arranged on the optical path. Therefore, in each of the laser microscopes, the optical axis adjustment unit controlled by the control unit based on the amount of shift in the optical axis of the laser beam detected with high accuracy by the optical axis shift detection unit can correct the shift in the optical axis of the laser beam supplied from the optical path switching unit with high accuracy.

In the above described first aspect, the light adjustment unit may be an optical element that is arranged on an optical path between the optical path switching unit and the optical axis shift detection unit and can continuously change the amount of the laser beam, and the control unit may acquire the distribution ratio of the beam splitter to be arranged on the optical path of the laser beam and control the light adjustment unit so that the amount of the laser beam to be incident on the optical axis shift detection unit falls within the predetermined range based on the acquired distribution ratio.

When the microscope system is thus configured, in each of the laser microscopes, the laser beam to be supplied from the optical path switching unit can be incident on the optical axis detection unit after the amount of the laser beam is restricted within the predetermined range regardless of the distribution ratio of the beam splitter to be arranged on the optical path.

In the above described first aspect, the laser light source can switch the wavelength of the laser beam, and the control unit may control the wavelength of the laser beam to be generated from the laser light source, and control the light adjustment unit based on a wavelength of the laser beam and the distribution ratio of the beam splitter to be arranged on the optical path of the laser beam.

An output of the laser light source may change depending on the wavelength of the generated laser beam. A reflection/transmission characteristic of the beam splitter may also change depending on the wavelength. When the microscope system is thus configured, therefore, the amount of the laser beam to be incident on the optical axis shift detection unit can fall within the predetermined range regardless of the wavelength of the laser beam to be generated from the laser light source and the reflection/transmission characteristic of the beam splitter arranged on the optical path of the laser beam.

In the above described first aspect, the light adjustment unit is a filter member that restricts an amount of passage of the laser beam by a predetermined amount corresponding to the distribution ratio of the beam splitter, and the filter member may be arranged to be in an insertable/removable manner on the optical path between the optical path switching unit and the optical axis shift detection unit.

When the microscope system is thus configured, in each of the laser microscopes, the laser beam to be supplied from the optical path switching unit can be incident on the optical axis shift detection unit after the amount of the laser beam is restricted within the predetermined range by only inserting and removing the light adjustment unit into and from the optical path of the laser beam depending on the distribution ratio of the beam splitter to be arranged on the optical path of the laser beam.

In the above described first aspect, the control unit may acquire the distribution ratio of the beam splitter arranged on the optical path of the laser beam, and control a sensitivity of the optical axis shift detection unit so that a signal level of the laser beam incident on the optical axis shift detection unit falls within a predetermined range based on the acquired distribution ratio.

Thus, in each of the laser microscopes, the control unit can detect the amount of shift in the optical axis of the laser beam with high accuracy by the optical axis shift detection unit regardless of the distribution ratio of the beam splitter arranged on the optical path when the signal level of the laser beam incident on the optical axis shift detection unit falls within the predetermined range by controlling the sensitivity of the optical axis shift detection unit based on the distribution ratio of the beam splitter to be arranged on the optical path.

In the above described first aspect, the laser light source can switch the wavelength of the laser beam, and the control unit may control the wavelength of the laser beam to be generated from the laser light source, and control the sensitivity of the optical axis shift detection unit based on the wavelength of the laser beam and the distribution ratio of the beam splitter to be arranged on the optical path of the laser beam.

When the microscope system is thus configured, the signal level of the laser beam incident on the optical axis shift detection unit can fall within the predetermined range regardless of the wavelength of the laser beam to be generated from the laser light source and the reflection/transmission characteristic of the beam splitter arranged on the optical path of the laser beam.

According to a second aspect of the present invention, a microscope system includes a laser light source that generates a laser beam, a plurality of laser microscopes, and an optical path switching unit that is provided between the plurality of laser microscopes and the laser light source and distributes the laser beam emitted from the laser light source among the laser microscopes, in which the optical path switching unit includes a plurality of beam splitters respectively having different distribution ratios for the laser beam, and can switch the laser microscope to which the laser beam is supplied by changing the beam splitter to be arranged on the optical path of the laser beam from the laser light source, and each of the plurality of laser microscopes includes an optical axis shift detection unit that detects an amount of shift in the optical axis of the laser beam supplied from the optical path switching unit from the optical axis of the laser microscope based on a position of incidence of the laser beam, a light adjustment unit that can adjust an amount of the laser beam to be incident on the optical axis shift detection unit, an optical axis adjustment unit that corrects a shift in the optical axis of the laser beam supplied from the optical path switching unit, and a control unit that controls the optical axis adjustment unit based on the amount of shift in the optical axis of the laser beam detected by the optical axis shift detection unit after the light adjustment unit restricts an amount of incidence of the laser beam within a predetermined range.

According to the second aspect of the present invention, the optical path switching unit distributes the laser beam emitted from the laser light source among the laser microscopes. The amount of the laser beam distributed among the laser microscopes is determined depending on the distribution ratio of the beam splitter to be arranged on the optical path of the laser beam. Therefore, the laser beam in a desired light amount can be selectively supplied to the desired laser microscope by arranging the appropriate beam splitter on the optical path.

In this case, the optical axis of the laser beam to be supplied to each of the laser microscopes from the optical path switching unit is shifted as the beam splitter to be arranged on the optical path changes. In each of the laser microscopes, the optical axis shift detection unit, which has restricted an amount of the laser beam incident thereon from the optical path switching unit in the predetermined range by the light adjustment unit, can detect the amount of shift in the optical axis of the laser beam with high accuracy regardless of the distribution ratio of the beam splitter be arranged on the optical path.

Therefore, in each of the laser microscopes, the optical axis adjustment unit controlled by the control unit based on the amount of shift in the optical axis of the laser beam detected with high accuracy by the optical axis detection unit can correct the shift in the optical axis of the laser beam supplied from the optical path switching unit with high accuracy. Accordingly, when a supply destination of the laser beam emitted from the laser light source is switched among the plurality of laser microscopes, the optical axis of the laser beam can be corrected so that the optical axis of the laser beam is not shifted in each of the laser microscopes.

In the above described second aspect, the light adjustment unit is an optical element that is arranged on an optical path between the optical path switching unit and the optical axis shift detection unit and can continuously change the amount of the laser beam, and the control unit may acquire the distribution ratio of the beam splitter arranged on the optical path of the laser beam, and control the light adjustment unit so that the amount of the laser beam to be incident on the optical axis shift detection unit falls within the predetermined range based on the acquired distribution ratio.

When the microscope system is thus configured, in each of the laser microscopes, the laser beam to be supplied from the optical path switching unit can be incident on the optical axis detection unit after the amount of the laser beam is restricted within the predetermined range regardless of the distribution ratio of the beam splitter to be arranged on the optical path.

In the above described second aspect, the laser light source can switch the wavelength of the laser beam, and the control unit may control the wavelength of the laser beam to be generated from the laser light source, and control the light adjustment unit based on the wavelength of the laser beam and the distribution ratio of the beam splitter arranged on the optical path of the laser beam.

An output of the laser light source may change depending on the wavelength of the generated laser beam. A reflection/transmission characteristic of the beam splitter may change depending on the wavelength. When the microscope system is thus configured, therefore, the amount of the laser beam to be incident on the optical axis shift detection unit can fall within the predetermined range regardless of the wavelength of the laser beam to be generated from the laser light source and the reflection/transmission characteristic of the beam splitter to be arranged on the optical path of the laser beam.

In the above described second aspect, the light adjustment unit is a filter member that restricts an amount of passage of the laser beam by a predetermined amount corresponding to the distribution ratio of the beam splitter, and the filter member may be arranged in an insertable/removable manner on the optical path between the optical path switching unit and the optical axis shift detection unit.

When the microscope system is thus configured, in each of the laser microscopes, the laser beam to be supplied from the optical path switching unit can be incident on the optical axis shift detection unit after the amount of the laser beam is restricted within the predetermined range by only inserting and removing the light adjustment unit into and from the optical path of the laser beam depending on the distribution ratio of the beam splitter to be arranged on the optical path of the laser beam.

In a third aspect of the present invention, a microscope system includes a laser light source that generates a laser beam, a plurality of laser microscopes, and an optical path switching unit that is provided between the plurality of laser microscopes and the laser light source and distributes the laser beam emitted from the laser light source among the laser microscopes, in which the optical path switching unit includes a plurality of beam splitters respectively having different distribution ratios for the laser beam, and can switch the laser microscope to which the laser beam is supplied by changing the beam splitter to be arranged on the optical path of the laser beam from the laser light source, and each of the plurality of laser microscopes includes an optical axis shift detection unit that detects an amount of shift in the optical axis of the laser beam supplied from the optical path switching unit from the optical axis of the laser microscope based on a position of incidence of the laser beam, an optical axis adjustment unit that can correct a shift in the optical axis of the laser beam supplied from the optical path switching unit, and a control unit that acquires the distribution ratio of the beam splitter arranged on an optical path of the laser beam and controls a sensitivity of the optical axis shift detection unit so that a signal level of the laser beam incident on the optical axis shift detection unit falls within a predetermined range based on the acquired distribution ratio while controlling the optical axis adjustment unit based on the amount of shift in the optical axis of the laser beam detected by the optical axis shift detection unit the sensitivity of which has been controlled.

In the third aspect of the present invention, in each of the laser microscopes, the control unit can cause the optical axis detection unit to detect the amount of shift in the optical axis of the laser beam with high accuracy regardless of the distribution ratio of the beam splitter arranged on the optical path when the signal level of the laser beam incident on the optical axis shift detection unit falls within the predetermined range by control of the sensitivity based on the distribution ratio of the beam splitter to be arranged on the optical path.

Therefore, when the supply destination of the laser beam emitted from the laser light source is switched among the plurality of laser microscopes, the optical axis adjustment unit can correct the optical axis of the laser beam detected with high accuracy by the optical axis shift detection unit so that the optical axis of the laser beam is not shifted in each of the laser microscopes based on the amount of shift in the optical axis of the laser beam.

In the above described third aspect, the laser light source can switch a wavelength of the laser beam, and the control unit may control the wavelength of the laser beam to be generated from the laser light source, and control the sensitivity of the optical axis shift detection unit based on the wavelength of the laser beam and the distribution ratio of the beam splitter to be arranged on the optical path of the laser beam.

When the microscope system is thus configured, the signal level of the laser beam incident on the optical axis shift detection unit can fall within the predetermined range regardless of the wavelength of the laser beam to be generated from the laser light source and the reflection/transmission characteristic of the beam splitter arranged on the optical path of the laser beam.

REFERENCE SIGNS LIST 100, 200, 300 Microscope system
1 Laser light source
2A, 2B Laser microscope
3 Optical path switching unit
4 Auto-alignment device
5 Scanner
5a, 5b Galvanometer mirror
6 Objective lens
7 Dichroic mirror
8 Light detector
9 Barrier filter
10 Optical axis adjustment unit
11 Storage unit
12 Control unit
13 Mirror
14 Position adjustment unit
15 Inclination adjustment unit
16 Fixed mirror
17 Switching mechanism
20 Optical axis shift detection unit
21, 22 Beam splitter
23, 24 Sensor
25 Shutter
27 AOM (light adjustment unit)
28 Monitor
29 Input unit
31, 32, 33 Beam splitter
51, 53 ND filter (light adjustment unit)

The invention claimed is:

1. A microscope system comprising:
a laser light source that outputs a laser beam;
a plurality of laser microscopes; and
an optical path switching unit that is provided between the laser light source and the plurality of laser microscopes and switches an optical path of the laser beam output from the laser light source among a plurality of optical paths respectively directed toward the plurality of laser microscopes,
wherein the optical path switching unit includes a plurality of beam splitters that respectively distribute the laser beam among the plurality of optical paths in different distribution ratios, and can switch the laser microscope to which the laser beam is supplied by changing the beam splitter to be arranged on an incident optical axis of the laser beam from the laser light source, and
wherein each of the plurality of laser microscopes includes:
an optical axis adjustment unit that adjusts an optical axis of the laser beam supplied from the optical path switching unit, and
a control unit that acquires identification information about the beam splitter arranged on the incident optical axis from the optical path switching unit and controls the optical axis adjustment unit based on the acquired identification information.

2. The microscope system according to claim 1, wherein:
the laser light source is configured to alternately select a wavelength of the laser beam to be output from among a plurality of wavelengths, and
the control unit acquires information about the selected wavelength of the laser beam from the laser light source, and controls the optical axis adjustment unit further based on the acquired information about the wavelength of the laser beam.

3. The microscope system according to claim 1, wherein:
each of the plurality of laser microscopes includes a storage unit that stores a preset table in which identification information about the plurality of beam splitters and correction values are made to correspond to each other, and
the control unit acquires the correction values, which are made to correspond to the identification information about the beam splitter acquired from the optical path switching unit, from the preset table, and controls the optical axis adjustment unit based on the acquired correction values.

4. The microscope system according to claim 2, wherein:
each of the plurality of laser microscopes includes a storage unit that stores a preset table in which correction values are made to correspond to each of combinations of the identification information about the plurality of beam splitters and the information about the plurality of wavelengths, and the control unit acquires the correction values, which are made to correspond to the combination of the identification information about the beam splitter and the information about the wavelength of the laser beam respectively acquired from the optical path switching unit and the laser light source, from the preset table, and controls the optical axis adjustment unit based on the acquired correction values.

5. The microscope system according to claim 2, wherein:
each of the plurality of laser microscopes includes a storage unit that stores a first preset table in which the identification information about the plurality of beam splitters and first correction values are made to correspond to each other, and a second preset table in which the information about the plurality of wavelengths and second correction values are made to correspond to each other, and the control unit acquires the first correction values, which are made to correspond to the identification information about the beam splitter acquired from the optical path switching unit, from the first preset table while acquiring the second correction values, which are made to correspond to the information about the wavelength of the laser beam acquired from the laser light source, from the second preset table, and controls the optical axis adjustment unit based on the acquired first correction values and the acquired second correction values.

6. The microscope system according to claim 1, wherein:
each of the laser microscopes includes an optical axis shift detection unit that detects an amount of shift in the optical axis of the laser beam to be supplied from the optical path switching unit from an optical axis of the laser microscope based on a position of incidence of the laser beam, and the control unit controls the optical axis adjustment unit further based on the amount of shift detected by the optical axis shift detection unit.

7. The microscope system according to claim 1, wherein the control unit causes the optical axis adjustment unit to adjust the optical axis of the laser beam when the optical axis switching unit changes the beam splitter arranged on the incident optical axis.

8. The microscope system according to claim 6, further comprising a light adjustment unit configured to adjust an amount of the laser beam to be incident on the optical axis shift detection unit.

9. The microscope system according to claim 8, wherein:
the light adjustment unit is an optical element that is arranged on an optical path between the optical path switching unit and the optical axis shift detection unit and is configured to continuously change the amount of the laser beam, and the control unit acquires the distribution ratio of the beam splitter arranged on the incident optical axis of the laser beam and controls the light adjustment unit so that the amount of the laser beam to be incident on the optical axis shift detection unit falls within a predetermined range based on the acquired distribution ratio.

10. The microscope system according to claim 8, wherein:
the laser light source is configured to switch a wavelength of the laser beam, and the control unit controls the wavelength of the laser beam to be generated from the laser light source, and controls the light adjustment unit based on the wavelength of the laser beam and the distribution ratio of the beam splitter arranged on the incident optical axis of the laser beam.

11. The microscope system according to claim 8, wherein the light adjustment unit is a filter member that restricts an amount of passage of the laser beam by a predetermined amount corresponding to the distribution ratio of the beam splitter, and the filter member is arranged in an insertable/removable manner on an optical path between the optical path switching unit and the optical axis shift detection unit.

12. The microscope system according to claim 6, wherein the control unit acquires the distribution ratio of the beam splitter arranged on the incident optical axis of the laser beam, and controls a sensitivity of the optical axis shift detection unit so that a signal level of the laser beam incident on the optical axis shift detection unit falls within a predetermined range based on the acquired distribution ratio.

13. The microscope system according to claim 12, wherein:
the laser light source is configured to switch a wavelength of the laser beam, and the control unit controls the wavelength of the laser beam to be generated from the laser light source, and controls the sensitivity of the optical axis shift detection unit based on the wavelength of the laser beam and the distribution ratio of the beam splitter arranged on the incident optical axis of the laser beam.

* * * * *